United States Patent
Hisatake

(10) Patent No.: US 7,889,292 B2
(45) Date of Patent: Feb. 15, 2011

(54) LIQUID CRYSTAL DISPLAY DEVICE

(75) Inventor: Yuzo Hisatake, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 245 days.

(21) Appl. No.: 12/147,600

(22) Filed: Jun. 27, 2008

(65) Prior Publication Data

US 2009/0027600 A1 Jan. 29, 2009

(30) Foreign Application Priority Data

Jul. 25, 2007 (JP) ............................. 2007-193769

(51) Int. Cl.
*G02F 1/1335* (2006.01)
(52) U.S. Cl. .......................................... 349/96; 349/98
(58) Field of Classification Search ........................ None
See application file for complete search history.

(56) References Cited

U.S. PATENT DOCUMENTS 6,124,971 A * 9/2000 Ouderkirk et al. ........... 359/487
6,507,380 B1 * 1/2003 Iijima .......................... 349/96
6,822,711 B1 * 11/2004 Yoshida et al. .............. 349/115
6,975,455 B1 * 12/2005 Kotchick et al. ............. 359/487

FOREIGN PATENT DOCUMENTS

| JP | 3015792 | | 12/1999 |
| JP | 2002-365625 | A * | 12/2002 |
| JP | 2003-195288 | A * | 7/2003 |
| JP | 2004-355032 | | 12/2004 |

* cited by examiner

*Primary Examiner*—Mike Stahl
(74) *Attorney, Agent, or Firm*—Finnegan, Henderson, Farabow, Garrett & Dunner, L.L.P.

(57) ABSTRACT

A liquid crystal display device comprises a liquid crystal display panel having a first substrate, a second substrate located opposite the first substrate with a gap between the first substrate and the second substrate, and a liquid crystal layer held between the first substrate and the second substrate, a polarizing plate located opposite the liquid crystal layer, and a polarizing reflection layer positioned opposite the polarizing plate across the liquid crystal layer and located opposite the liquid crystal layer to reflect linearly polarized light polarized in one direction parallel to a plane of the liquid crystal display panel.

16 Claims, 21 Drawing Sheets

| | Solid black display transmittance (K) | Solid white display transmittance (W) | Contrast ratio (W/K) | 50% black and 50% white display black transmittance (K50) | 50% black and 50% white display white transmittance (W50) | 50% black and 50% white display contrast ratio (W50/K50) |
|---|---|---|---|---|---|---|
| First embodiment of present invention | 0.020% | 9.25% | 463:1 | 0.020% | 8.62% | 431:1 |
| Comparative example | 0.021% | 6.21% | 296:1 | 0.021% | 6.21% | 296:1 |

FIG. 9

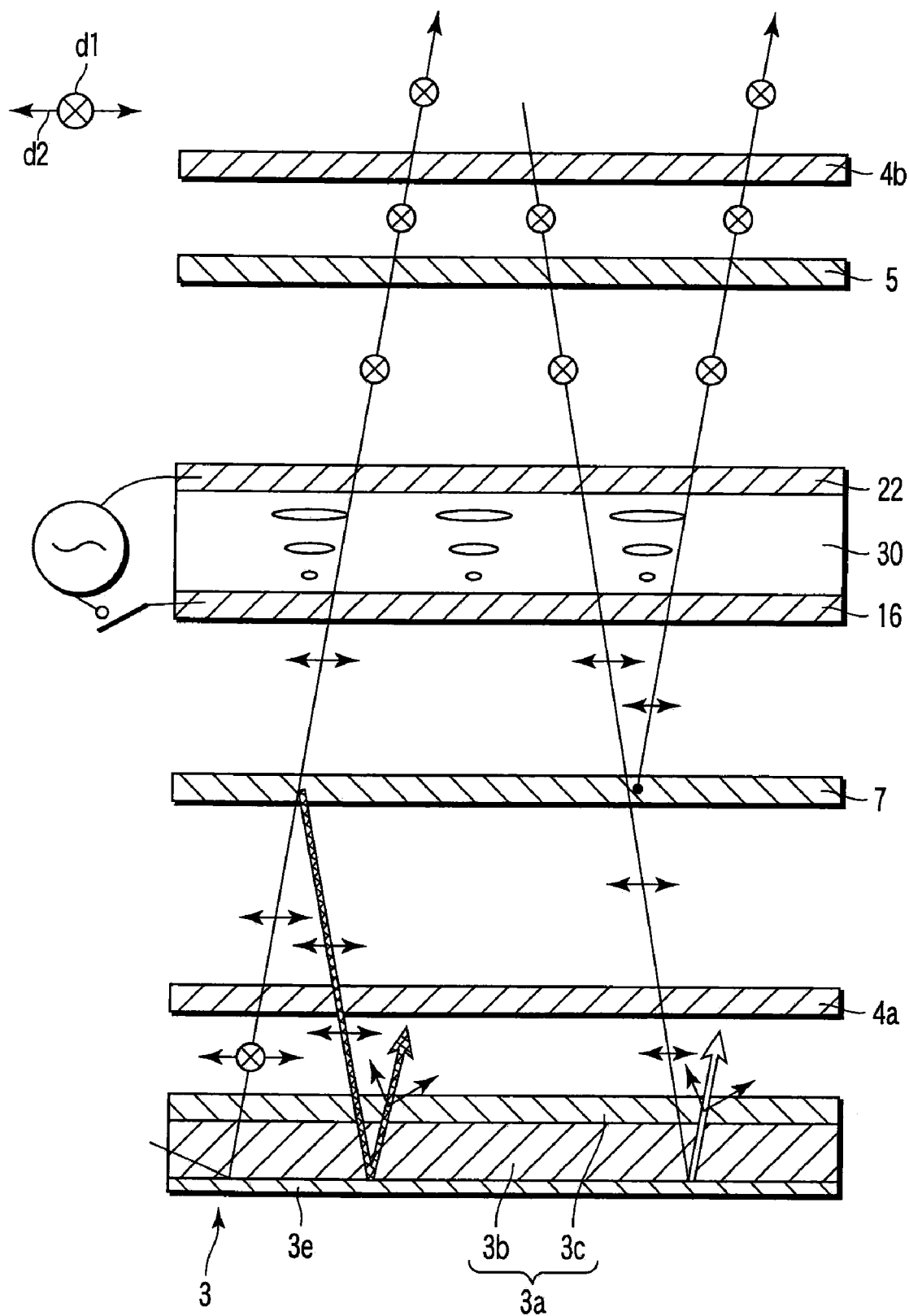
F I G. 16

FIG. 17

| | Solid black display transmittance (K) | Solid white display transmittance (W) | Transmission mode contrast ratio (W/K) | Solid black display reflectance (RK) | Solid white display reflectance (RW) | Reflection mode contrast ratio (RW/RK) |
|---|---|---|---|---|---|---|
| Second embodiment of present invention | 0.040% | 12.25% | 306:1 | 0.12% | 2.92% | 24:1 |
| Comparative example | 0.041% | 9.35% | 228:1 | 0.12% | 2.35% | 20:1 |

FIG. 22

| | Solid black display transmittance (K) | Solid white display transmittance (W) | Transmission mode contrast ratio (W/K) | Solid black display reflectance (RK) | Solid white display reflectance (RW) | Reflection mode contrast ratio (RW/RK) |
|---|---|---|---|---|---|---|
| Third embodiment of present invention | 0.040% | 12.25% | 306:1 | 0.12% | 2.92% | 24:1 |
| Comparative example | 0.041% | 9.35% | 228:1 | 0.12% | 2.35% | 20:1 |

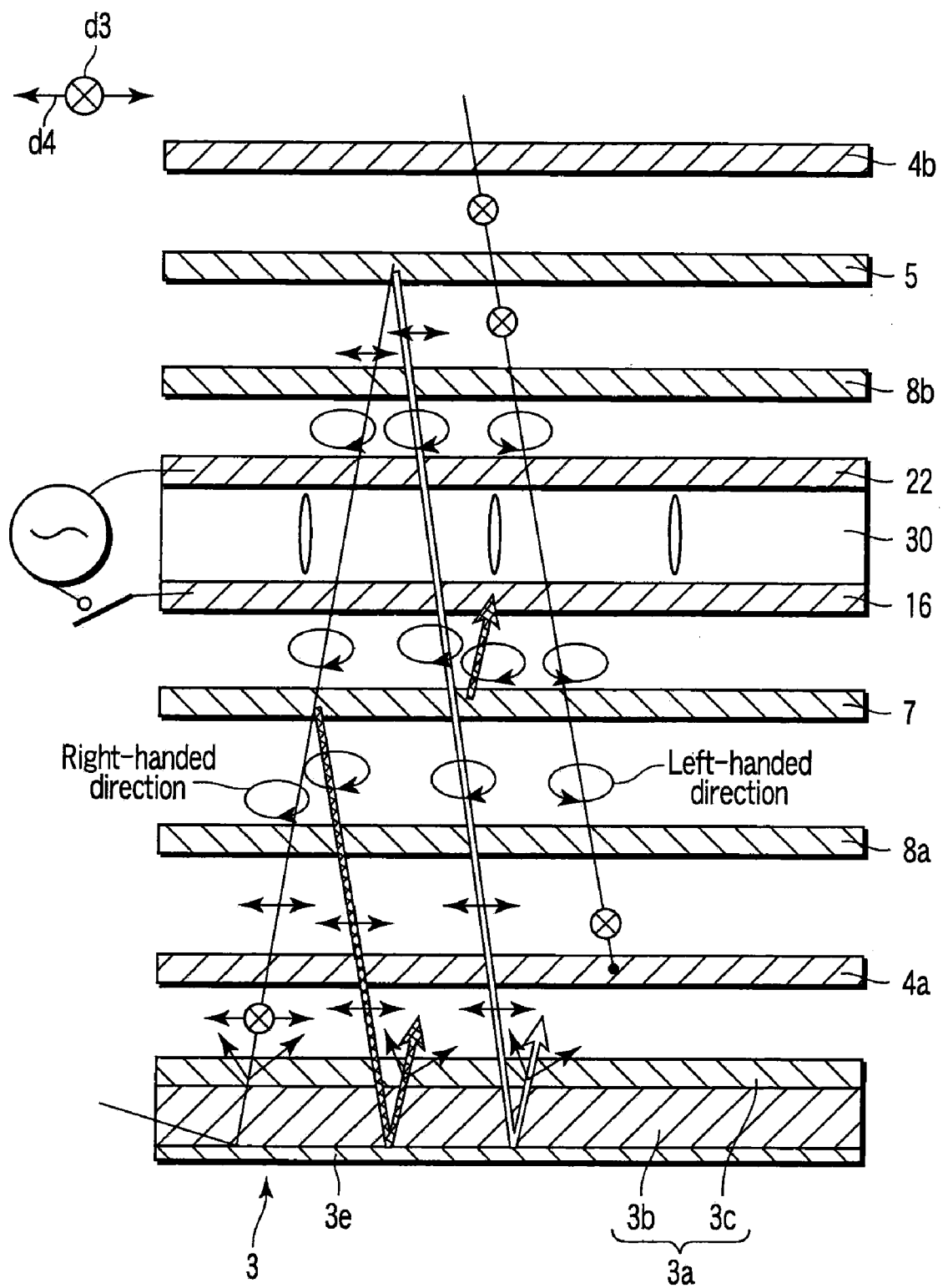
F I G. 20

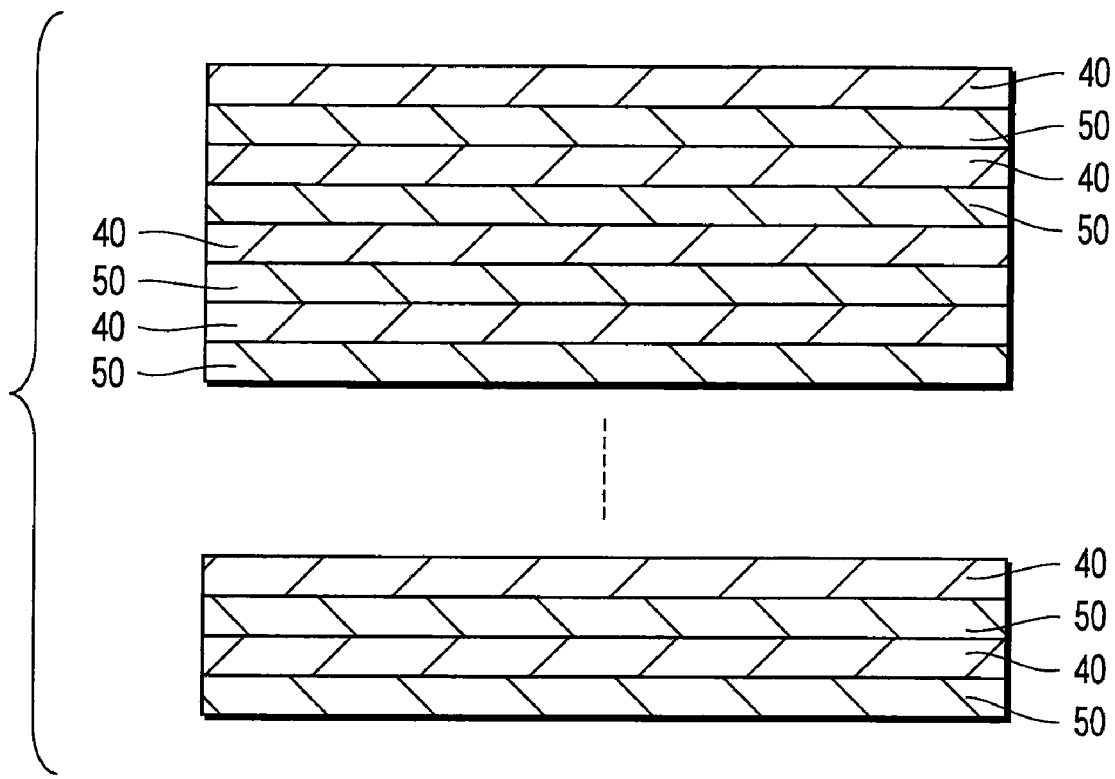
F I G. 24
F I G. 25

LIQUID CRYSTAL DISPLAY DEVICE

CROSS-REFERENCE TO RELATED APPLICATIONS

This application is based upon and claims the benefit of priority from prior Japanese Patent Application No. 2007-193769, filed Jul. 25, 2007, the entire contents of which are incorporated herein by reference.

BACKGROUND OF THE INVENTION

1. Field of the Invention

The present invention relates to a liquid crystal display device, and in particular, to a transmissive liquid crystal display device.

2. Description of the Related Art

Liquid crystal display devices are generally known as image display devices. The liquid crystal display device is used in display sections of notebook personal computers, monitors, car navigation systems, alpha calculators, medium- and small-sized television receivers, and the like. The liquid crystal display device comprises an array substrate, an opposite substrate, and a liquid crystal layer. Among the liquid crystal display devices, a transmissive type and a semi-transmissive type comprising a backlight unit have a high contrast characteristic. Thus, the liquid crystal display device is used for a high-display-capacity apparatus with a plurality of image portions and is specifically used in display sections of notebook personal computers, monitors, car navigation systems, television receivers, and the like.

To offer a high contrast characteristic, almost all the liquid crystal display devices use a polarizing plate and a switching element such as TFT (Thin Film Transistor) or TFD (Thin Film Diode), and have a color filter for color display. However, this configuration may reduce the utilization efficiency and transmittance of light. This may in turn increase the power consumption of the backlight unit and prevent a sufficient display luminance from being achieved.

On the other hand, currently adopted display modes include a twisted nematic (TN) mode and a vertical alignment (VA) mode (hereinafter referred to as a VA mode). These modes allow liquid crystal molecules to be uniformly arranged when no electric field is applied to a liquid crystal layer, and allow the arrangement of the liquid crystal molecules to be uniformly changed when an electric field is applied to the liquid crystal layer.

In recent years, the electric field applied to the liquid crystal layer is controlled to arrange the liquid crystal molecules in each pixel in a plurality of (at least two) directions. The liquid crystal display device performs pixel orientation division, for example, as shown in Jpn. Pat. Appln. KOKAI Publication No. 2004-355032. This makes it possible to average the dependence of a visual angle on the direction in which the liquid crystal molecules are arranged, enabling the improvement of a visual angle characteristic, which has been an objective of the TN and VA modes.

The pixel orientation division results in an area in the pixel in which the liquid crystal molecules are arranged in a different direction. Thus, a phase difference in backlight is reflected even in white display pixels, and part of the backlight is absorbed by the polarizing plate. In particular, in a multi-domain VA (Vertical Alignment) mode (hereinafter referred to as an MVA mode), Schlieren orientation occurs inevitably, that is, a cross-shaped area is inevitably created in which the liquid crystal molecules are not uniformly arranged. Thus, as described above, the phase difference in the backlight is reflected even in the white display pixels, and part of the backlight is absorbed by the polarizing plate. As described above, the liquid crystal display device with the pixel orientation division offers a lower light utilization efficiency than the liquid crystal display device without the pixel orientation division.

BRIEF SUMMARY OF THE INVENTION

The present invention is made in view of the above-described points. An object of the present invention is to provide a liquid crystal display device that offers a high light utilization efficiency.

To achieve the object, according to an aspect of the present invention, there is provided a liquid crystal display device comprising:

a liquid crystal display panel having a first substrate, a second substrate located opposite the first substrate with a gap between the first substrate and the second substrate, and a liquid crystal layer held between the first substrate and the second substrate;

a polarizing plate located opposite the liquid crystal layer;

a polarizing reflection layer positioned opposite the polarizing plate across the liquid crystal layer and located opposite the liquid crystal layer to reflect linearly polarized light polarized in one direction parallel to a plane of the liquid crystal display panel; and an another polarizing plate positioned opposite the liquid crystal layer across the polarizing reflection layer and located opposite the polarizing reflection layer, another polarizing plate having an absorption axis parallel to a polarizing direction of the linearly polarized light reflected by the polarizing reflection layer.

According to another aspect of the present invention, there is provided a liquid crystal display device comprising:

a liquid crystal display panel having a first substrate, a second substrate located opposite the first substrate with a gap between the first substrate and the second substrate, and a liquid crystal layer held between the first substrate and the second substrate;

a polarizing plate located opposite the liquid crystal layer; and a polarizing reflection layer positioned opposite the polarizing plate across the liquid crystal layer and located opposite the liquid crystal layer to reflect linearly polarized light polarized in one direction parallel to a plane of the liquid crystal display panel.

According to another aspect of the present invention, there is provided a liquid crystal display device comprising:

a liquid crystal display panel having a first substrate, a second substrate located opposite the first substrate with a gap between the first substrate and the second substrate, and a liquid crystal layer held between the first substrate and the second substrate;

a polarizing plate located opposite the liquid crystal layer;

a polarizing reflection layer positioned opposite the polarizing plate across the liquid crystal layer and located opposite the liquid crystal layer to reflect linearly polarized light polarized in one direction parallel to a plane of the liquid crystal display panel;

an another polarizing plate positioned opposite the liquid crystal layer across the polarizing reflection layer and located opposite the polarizing reflection layer, another polarizing plate having an absorption axis parallel to a polarizing direction of the linearly polarized light reflected by the polarizing reflection layer;

a quarter wavelength plate located between the liquid crystal layer and the polarizing plate;

an another quarter wavelength plate located between the liquid crystal layer and the polarizing reflection layer; and an another polarizing reflection layer located between the liquid crystal layer and the quarter wavelength plate to reflect circularly polarized light passing through the quarter wavelength plate and entering another polarizing reflection layer so that a polarity of the reflected circularly polarized light remains unchanged.

According to another aspect of the present invention, there is provided a liquid crystal display device comprising:

a liquid crystal display panel having a first substrate, a second substrate located opposite the first substrate with a gap between the first substrate and the second substrate, and a liquid crystal layer held between the first substrate and the second substrate;

a polarizing plate located opposite the liquid crystal layer;

a polarizing reflection layer positioned opposite the polarizing plate across the liquid crystal layer and located opposite the liquid crystal layer to reflect linearly polarized light polarized in one direction parallel to a plane of the liquid crystal display panel;

a quarter wavelength plate located between the liquid crystal layer and the polarizing plate;

an another quarter wavelength plate located between the liquid crystal layer and the polarizing reflection layer; and an another polarizing reflection layer located between the liquid crystal layer and the quarter wavelength plate to reflect circularly polarized light passing through the quarter wavelength plate and entering another polarizing reflection layer so that a polarity of the reflected circularly polarized light remains unchanged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a diagram showing, in tabular form, measured values of a solid black display transmittance, a solid white display transmittance, a contrast ratio, a 50% black and 50% white display black transmittance, a 50% black and 50% white display white transmittance, and a 50% black and 50% white display contrast ratio in the first embodiment and a comparative example;

FIG. 16 is a diagram illustrating the optical characteristics and optical path observed when no voltage is applied to the liquid crystal display panel shown in FIG. 14;

FIG. 17 is a diagram showing, in tabular form, measured values of a solid black display transmittance, a solid white display transmittance, a transmission mode contrast ratio, a solid black display reflectance, a solid white display reflectance, and a reflection mode contrast ratio in the second embodiment and a comparative example;

FIG. 20 is a diagram illustrating the optical characteristics and optical path observed when no voltage is applied to a liquid crystal display panel shown in FIG. 19;

FIG. 22 is a diagram showing, in tabular form, measured values of the solid black display transmittance, the solid white display transmittance, the transmission mode contrast ratio, the solid black display reflectance, the solid white display reflectance, and the reflection mode contrast ratio in the third embodiment and a comparative example;

FIG. 24 is a sectional view showing a variation of the polarizing reflection layer according to the present invention which has a linearly polarized light reflecting function; and FIG. 25 is a sectional view showing a variation of the polarizing reflection layer according to the present invention which has a circularly polarized light reflecting function.

DETAILED DESCRIPTION OF THE INVENTION

Figure 1:
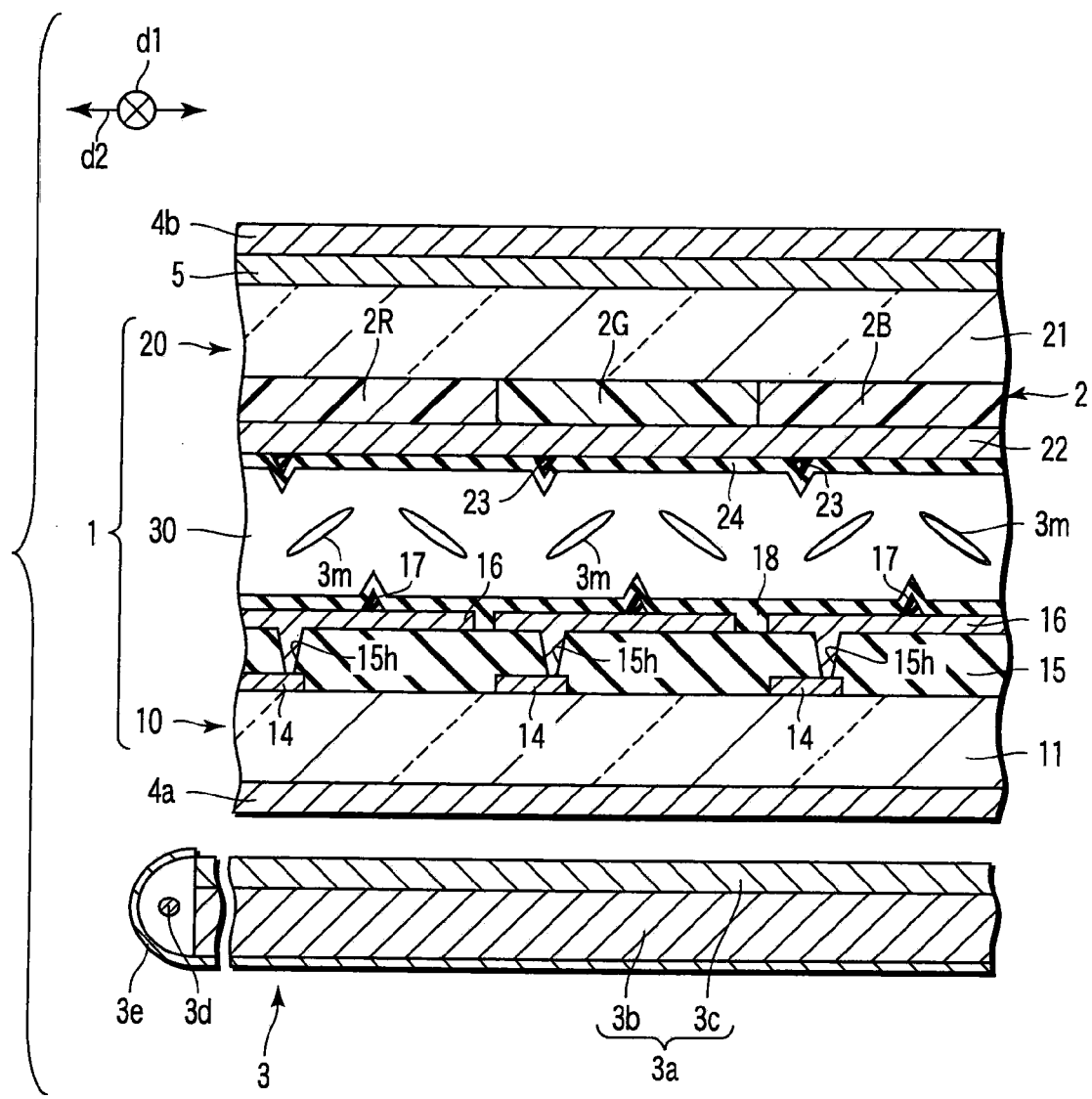
FIG. 1 is a sectional view showing a liquid crystal display device according to a first embodiment of the present invention.
Figure 2:
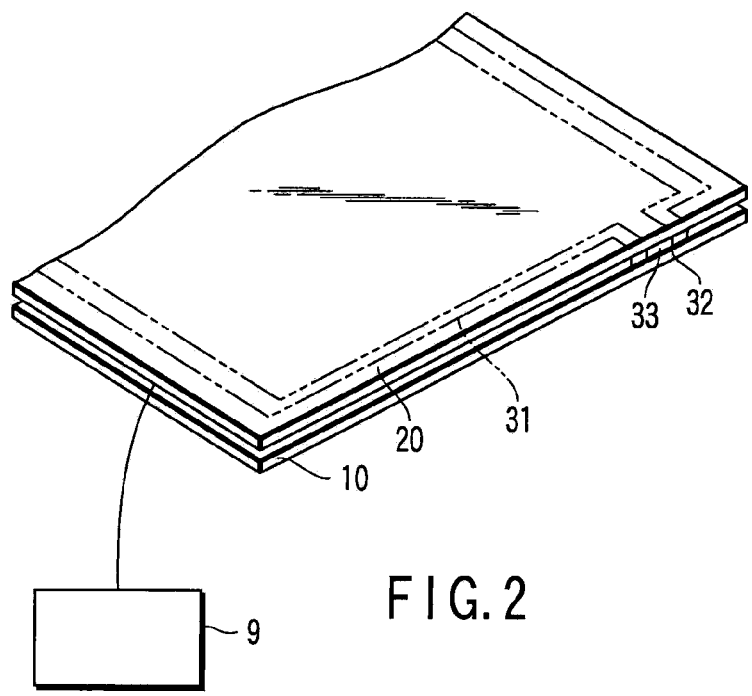
FIG. 2 is a perspective view showing a liquid crystal display panel shown in FIG. 1 as well as a control portion.
Figure 3:
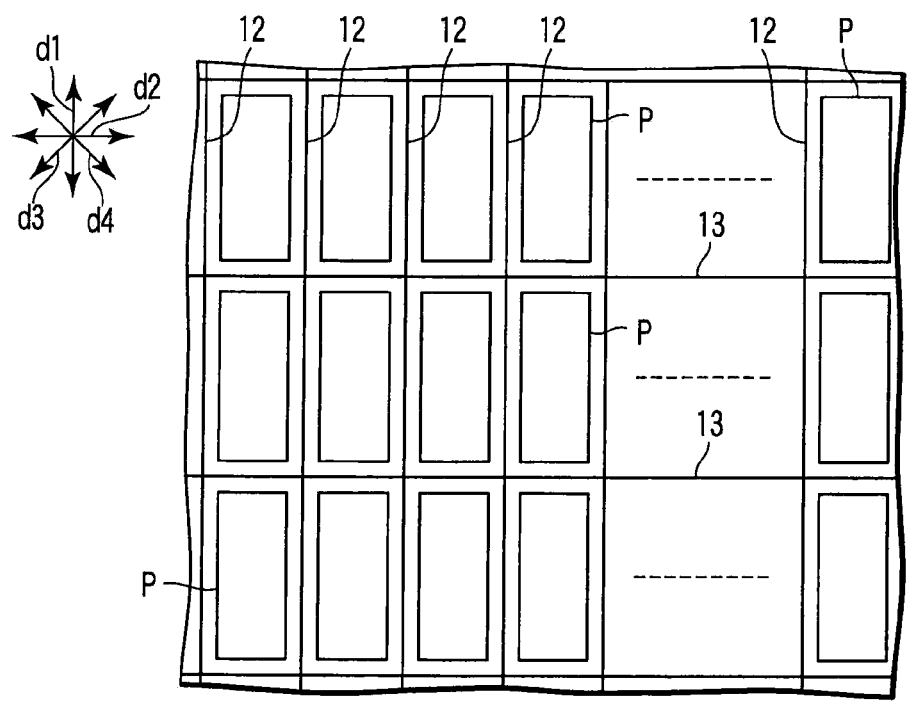
FIG. 3 is a schematic plan view of the liquid crystal display panel shown in FIGS. 1 and 2.
Figure 4:
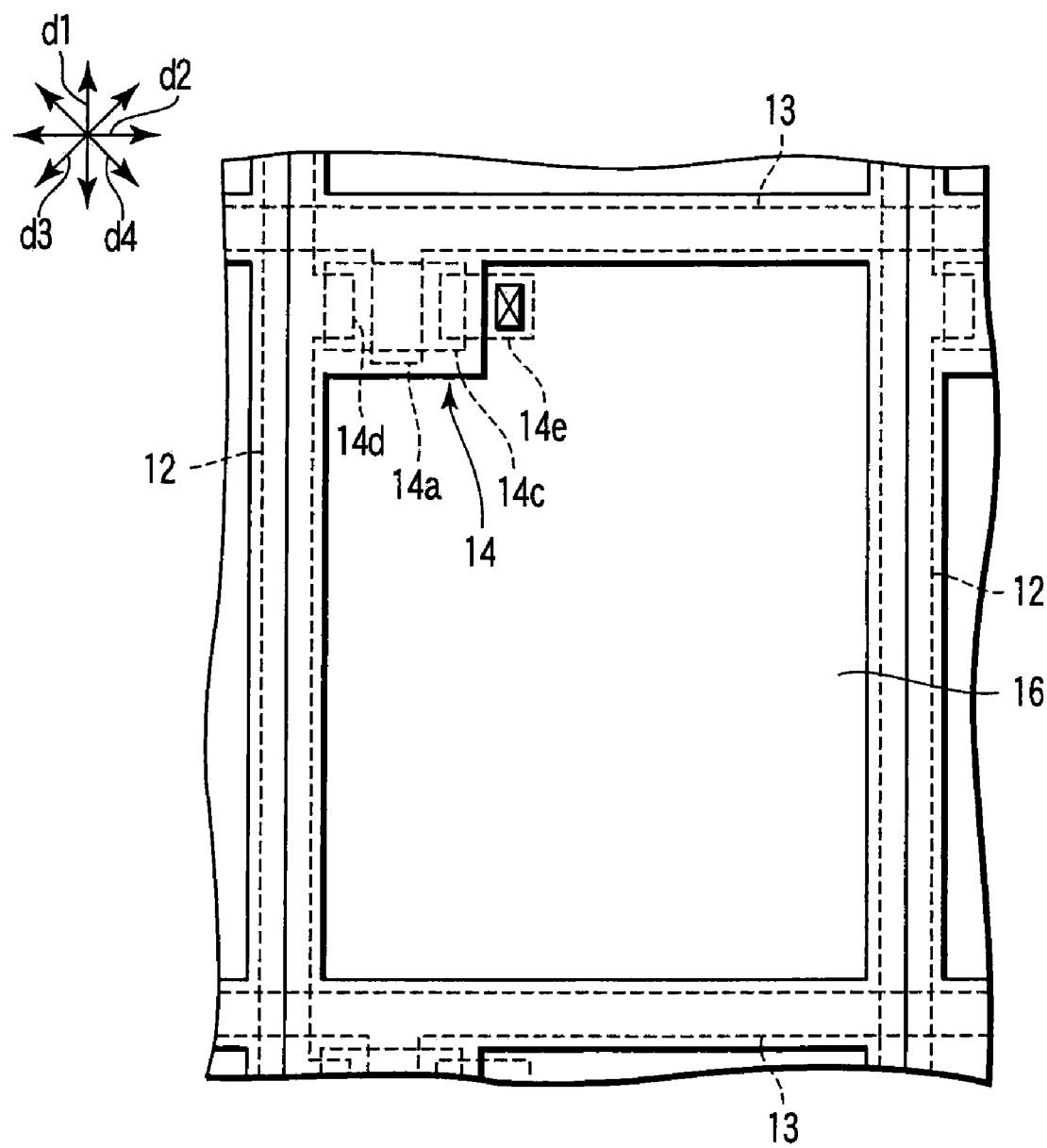
FIG. 4 is a plan view schematically showing a wiring structure in the liquid crystal display panel shown in FIGS. 1, 2, and 3.

With reference to the drawings, a detailed description will be given of a liquid crystal display device according to a first embodiment of the present invention.

As shown in FIGS. 1 to 4, the liquid crystal display device comprises a liquid crystal display panel 1, a color filter 2, a backlight unit 3, a polarizing plate 4a, a polarizing plate 4b, a polarizing reflection layer 5, and a control section 9.

The liquid crystal display panel 1 comprises an array substrate 10, an opposite substrate 20 arranged opposite to the array substrate 10 with a predetermined gap between the array substrate 10 and the opposite substrate 20, and a liquid crystal layer 30 held between the array substrate and the opposite substrate. The liquid crystal display panel 1 comprises a rectangular display area R.

The array substrate 10 as a first substrate has a rectangular glass substrate 11. The opposite substrate 20 as a second substrate has a rectangular glass substrate 21. The glass substrates 11 and 21 are formed of non-alkaline glass manufactured by Corning Incorporated. The array substrate 10 and the opposite substrate 20 are not limited to the glass substrates but have only to have transparent insulating substrates. In the display area R, the liquid crystal display panel 1 has a plurality of pixel portions P into which the liquid crystal display panel 1 is divided in a direction along the plane of the liquid crystal display panel and which are arranged in a matrix. The pixel portions P are arranged in a first direction d1 along the plane of the liquid crystal display panel 1 and a second direction d2 orthogonal to the first direction.

In the array substrate 10, a plurality of signal lines 12 and a plurality of scanning lines 13 are arranged on the glass substrate 11 in a lattice; the signal lines 12 extend in the second direction d2, and the scanning lines 13 cross the signal lines and extend in the first direction d1. Each of the pixel portions P is overlappingly provided in an area enclosed by the two adjacent signal lines 12 and the two adjacent scanning lines 13.

For example, a plurality of TFTs (Thin Film Transistors) 14 are provided close to a portion on the glass substrate in which the signal line 12 crosses the scanning line 13. TFT 14 has a gate electrode 14a formed by extending a part of the scanning line 13, a gate insulating film (not shown) provided on a gate electrode, a channel layer 14c located opposite the gate electrode via the gate insulating film, a source electrode 14d connected to one area of the channel layer, and a drain electrode 14e connected to the other area of the channel layer.

The source electrode 14d is connected to the signal line 12. The drain electrode 14e is connected to a pixel electrode 16 described below. Although not shown, TFTs 14 are formed of a common gate insulating film. A TFT 14 is provided in each of the pixel portion P to constitute the pixel portion P.

An interlayer insulating film 15 is formed on the glass substrate 11, the signal lines 12, the scanning lines 13, and TFTs 14. In the display area R, a plurality of the pixel electrodes 16 are provided on the interlayer insulating film 15 in a matrix. The pixel electrodes 16 are formed of a transparent conductive material such as ITO (Indium Tin Oxide). Each of the pixel electrodes 16 is electrically connected to the drain electrode 14e of the corresponding TFT 14 via a contact hole 15h formed in the interlayer insulating film 15. The pixel electrode 16 is provided in each of the pixel portions P to constitute the pixel portion.

A plurality of protrusions 17 are formed on the interlayer insulating film 15 and the pixel electrodes 16 as orientation control portion. The protrusions 17 protrude from surfaces of the interlayer insulating film 15 and the pixel electrodes 16 toward the opposite substrate 20. Each of the protrusions 17 has a triangular cross section and extends in a predetermined direction. The protrusions 17 overlap the respective pixel electrodes 16. The protrusions 17 have a function of controlling a direction in which liquid crystal molecules 3m in an opposite liquid crystal layer 30 are inclined. In the present embodiment, the protrusions 17 extend in a third direction d3 and a fourth direction d4. The third direction d3 and the fourth direction d4 are inclined at 45° to the first direction d1 and the second direction d2, respectively.

Although not shown, a plurality of columnar spacers are formed on the pixel electrodes 16 as a plurality of spacers. The columnar spacers are positioned away from the protrusions 17. The spacers are not limited to the columnar shape. Spacers of other shapes, such as spherical ones, may also be used. An alignment film 18 is deposited on the interlayer insulating film 15, the pixel electrodes 16, and the protrusions 17. In the present embodiment, the alignment film 18 is a vertical alignment film. The alignment film 18 is formed using JALS-204-R14 (manufactured by JSR).

In the opposite substrate 20, a color filter 2 is disposed on the glass substrate 21. The color filter 2 has a plurality of red colored layers 2R, a plurality of green colored layers 2G, and a plurality of blue colored layers 2B. In the present embodiment, the color filter 2 is disposed on an inner surface of the substrate.

The colored layers 2R, 2G, and 2B extend in the first direction d1 and in strips. The colored layers 2R, 2G, and 2B overlap the plurality of pixel electrodes 16, arranged in the first direction d1. Peripheral portions of the colored layers 2R, 2G, and 2B overlap the signal lines 12. The colored layers 2R, 2G, and 2B are alternately arranged adjacent to one another in the second direction d2.

The opposite electrode 22, made up of a transparent conductive material such as ITO, is formed on the color filter 2. A plurality of protrusions 23 are formed on the opposite electrode 22 as orientation control portion. The protrusions 23 protrude from a surface of the opposite electrode 22 toward the array substrate 10. Each of the protrusions 23 has an almost triangular cross section and extends in a predetermined direction. In the present embodiment, the protrusions 23 project in the third direction d3 and the fourth direction d4.

The protrusions 23 have a function of controlling the direction in which the liquid crystal molecules 3m in the liquid crystal layer 30 are inclined. An alignment film 24 is deposited on the opposite electrode 22 and the projections 23. In the present embodiment, the alignment film 24 is a vertical alignment film. The alignment film 24 is formed using JALS-204-R14 (manufactured by JSR).

The array substrate 10 and the opposite substrate 20 are arranged opposite to each other with a predetermined gap between the array substrate 10 and the opposite substrate 20 by the plurality of columnar spacers. The array substrate 10 and the opposite substrate 20 are joined to each other with a sealing member 31 that is arranged on peripheral portions of both substrates.

The liquid crystal layer 30 is held between the array substrate 10 and the opposite substrate 20. A liquid crystal injection port 32 is formed in a part of the sealing member 31 and sealed with a sealant 33. The liquid crystal layer 30 exhibits dielectric constant anisotropy formed by a negative nematic liquid crystal. In the present embodiment, the liquid crystal layer 30 is formed using MLC2038 (manufactured by Merck Ltd., Japan).

The liquid crystal layer 30 has And set to 350 nm at a wavelength of 550 nm. With no electric field applied to the liquid crystal layer 30, the liquid crystal layer exhibits a phase difference amount of 0. With a sufficient electric field applied to the liquid crystal layer, the liquid crystal layer exhibits a phase difference amount equal to the half of an incident light wavelength.

As described above, the display mode of the liquid crystal display panel 1 is the pixel orientation dividing VA mode. With no electric field applied to the liquid crystal layer 30, the liquid crystal molecules 3m are oriented in a direction perpendicular to the plane of the liquid crystal display panel 1. The orientation is controlled such that with an electric field applied to the liquid crystal layer 30, the liquid crystal molecules 3m are inclined in multiple directions parallel to the plane of the liquid crystal display panel 1. More specifically, the orientation is controlled such that the liquid crystal molecules 3m are inclined in the third direction d3 and the fourth direction d4. However, the liquid crystal molecules 3m are also inclined in the first direction d1 and the second direction d2. As described above, the protrusions 17 and 23 are formed to orient the liquid crystal molecules 3m in each pixel portion P in multiple directions with an electric field applied to the liquid crystal layer 30.

The backlight unit 3 is located outside and opposite the array substrate 10. The backlight unit 3 comprises a light guiding member 3a located outside and opposite the array substrate 10 and a light source 3d and a reflector 3e arranged opposite a side edge of the light guiding member. The light guiding member 3a has a light guiding plate 3b and a light diffusion layer 3c positioned between the light guiding plate and the array substrate 10, and is provided on the light guiding plate.

The polarizing plate 4a is located opposite the liquid crystal layer 30. More specifically, the polarizing plate 4a is positioned between the array substrate 10 and the backlight unit 3, and is located outside and opposite the array substrate. The polarizing plate 4a has an absorption axis parallel to the first direction d1. In the present embodiment, the polarizing plate 4a is laminated to an outer surface of the array substrate. The polarizing plate 4a is formed using SEG1425 (manufactured by NITTO DENKO CORPORATION).

The polarizing reflection layer 5 is positioned opposite the polarizing plate 4a across the liquid crystal layer 30. More specifically, the polarizing reflection layer 5 is positioned opposite the polarizing plate 4a across the liquid crystal display panel 1 and located opposite the opposite substrate 20. The polarizing reflection layer 5 reflects linearly polarized light polarized in one direction parallel to the plane of the liquid crystal display panel 1. In the present embodiment, the polarizing reflection layer 5 is laminated to an outer surface of the opposite substrate 20, and has a reflection axis parallel to the second direction d2. Thus, the polarizing reflection layer 5 reflects linearly polarized light polarized in the second direction d2. The polarizing reflection layer 5 is formed of DBEF (manufactured by 3M) using a base film with almost no phase difference. The polarizing reflection layer 5 may be configured without the base film by sticking the base material of DBEF directly to the polarizing plate 4b.

The polarizing plate 4b as an another polarizing plate is positioned opposite the liquid crystal layer 30 across the polarizing reflection layer 5. The polarizing plate 4b is positioned opposite the liquid crystal display panel 1 across the polarizing reflection layer 5 and located opposite the polarizing reflection layer 5. The polarizing plate 4b has an absorption axis parallel to a direction in which the linearly polarized light reflected by the polarizing reflection layer 5 is polarized. In the present embodiment, the polarizing plate 4b is laminated to an outer surface of the polarizing reflection layer 5 and has an absorption axis parallel to the first direction d1. The polarizing plate 4b is formed using SEG1425 (manufactured by NITTO DENKO CORPORATION).

The control portion 9 is electrically connected to the liquid crystal display panel 1. The control portion 9 applies a driving voltage between the pixel electrode 16 and the opposite electrode 22 in association with the display condition of the liquid crystal display panel 1. The application of the driving voltage applies an electric field to the liquid crystal layer 30. When the control portion 9 does not apply the driving voltage to the liquid crystal display panel, the liquid crystal display panel 1 is in a black display condition. When the control portion 9 applies the driving voltage to the liquid crystal display panel, the liquid crystal display panel 1 is in a white display condition.

Now, description will be given of the orientation condition of the liquid crystal molecules 3m in the liquid crystal layer 30.

In general, the liquid crystal display device is designed to display black with a phase difference or rotary polarization in the liquid crystal layer 30 set to zero or a value close to zero in order to avoid in-plane luminance unevenness during black display and the dependence of luminance on temperature. Conversely, the liquid crystal display device is designed to display white with the phase difference in the liquid crystal layer set equal to a quarter or half wavelength or with the liquid crystal layer set at an angle of rotation of 90°.

In the present embodiment, it is assumed that the device is designed to provide black display, white display, and an intermediate condition between the black display and the white display by using an electric field to vary the phase difference in the liquid crystal layer 30 from 0 to the half wavelength. The white display is obtained when the liquid crystal molecules 3m are arranged in an in-plane direction. In the white display and the intermediate condition, the uniform inclining direction of the liquid crystal molecules 3m varies visual characteristics. To completely eliminate this variation, it is necessary to orient the liquid crystal molecules in at least four directions (for example, the vertical and lateral directions of the display screen). However, in this case, the liquid crystal molecules are forced to be also oriented in intermediate directions among the four directions.

If the liquid crystal molecules are oriented in only the four directions and a boundary where the orientation of the liquid crystal molecules is discontinuous is present in the pixel portion P, a discrimination defect may occur to affect the image display. To avoid this, the boundary may be shielded. However, in this case, the light utilization efficiency is reduced.

If the phase difference in the liquid crystal layer 30 is equal to the half wavelength in an area in which the liquid crystal molecules 3m are oriented in the third direction d3 and the fourth direction d4, no phase difference occurs in an area in which the liquid crystal molecules 3m are oriented in the first direction d1 and the second direction d2. That is, the phase difference amount is zero. With the conventional liquid crystal display device having no polarizing reflection layer 5, light having passed through the liquid crystal layer 30 in the area with the phase difference amount of zero is absorbed by the polarizing plate 4b.

However, with the liquid crystal display device according to the present embodiment, light having passed through the liquid crystal layer 30 in the area with the phase difference amount of zero is absorbed is reflected by the polarizing reflection layer 5. The light reflected by the polarizing reflection layer 5 returns to the backlight unit 3 for recycling. Thus, the luminance of the display image can be improved. As is the case with the present embodiment, with the liquid crystal display device with the pixel orientation division, an area that provides the black display regardless of a display pattern is created in the pixel portion P. Consequently, the provision of the polarizing reflection layer 5 is very effective.

Now, the orientation control portion will be described. The orientation control portion has only to be able to orient the liquid crystal molecules in the pixel portion P in a plurality of directions. The orientation control portion is not limited to the protrusions 17 and 23. For example, the orientation control portion may be formed by modifying the shape of the pixel electrodes 16, the alignment films 18 and 24 to be subjected to orientation control, an orientation processing method, and the like.

Now, description will be given of the optical characteristics of the liquid crystal display device observed when the driving voltage is not applied between the pixel electrode 16 and the opposite electrode 22 (no electric field is applied to the liquid crystal layer 30), together with the optical path of light having exited the backlight unit 3.

Figure 5:
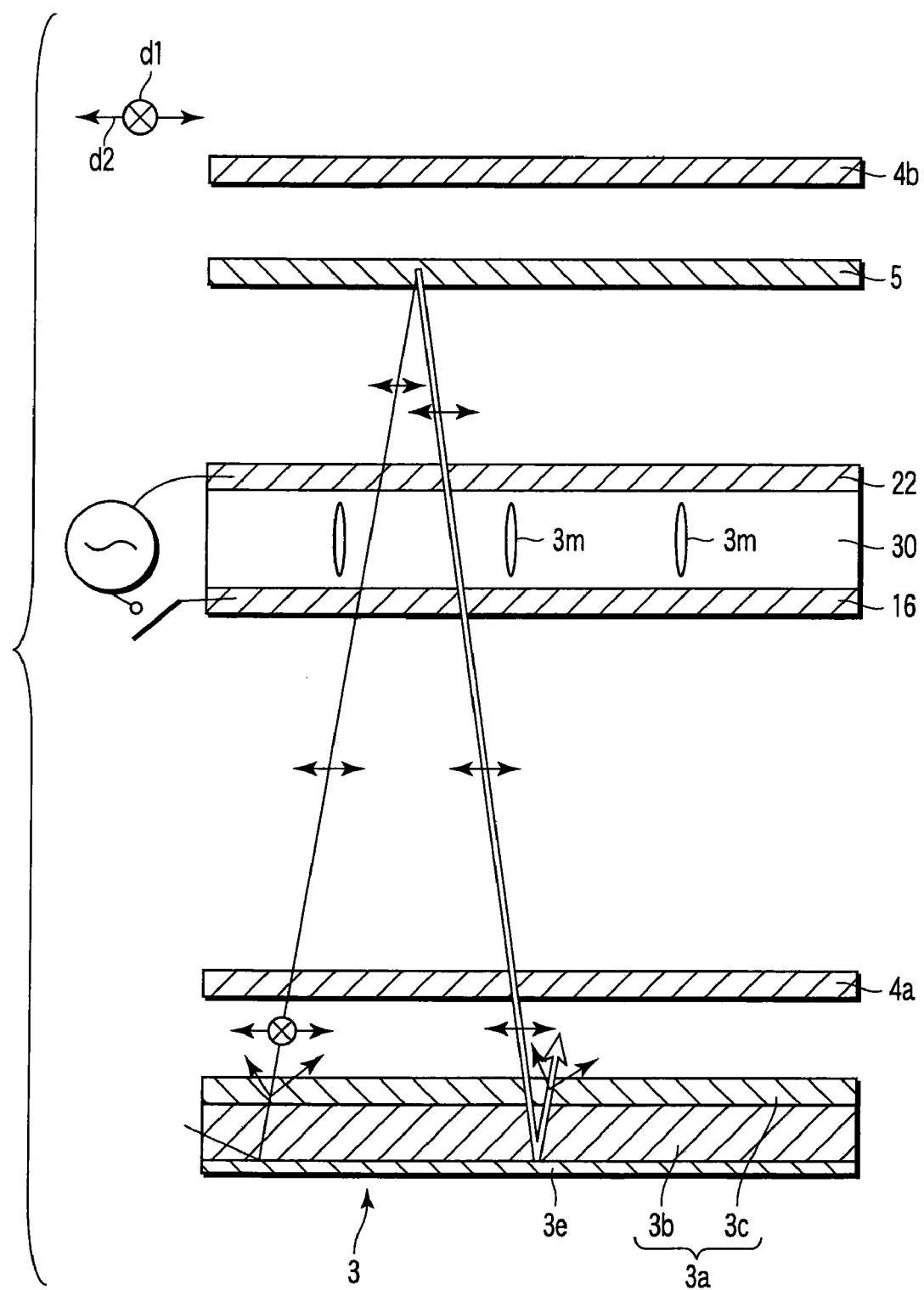
FIG. 5 is a diagram illustrating optical characteristics and an optical path observed when no voltage is applied to the liquid crystal display panel shown in FIG. 1.
Figure 7:
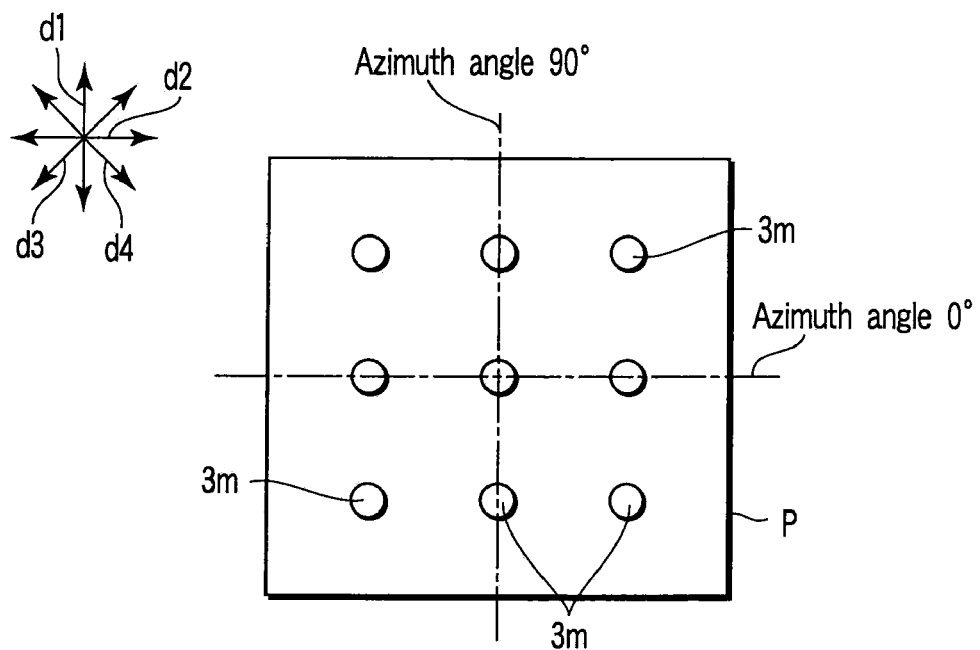
FIG. 7 is a schematic plan view of the liquid crystal display panel comprising a liquid crystal layer as shown in FIG. 5, showing how liquid crystal modules are oriented.

As shown in FIGS. 5 and 7, the liquid crystal molecules 3m in the liquid crystal layer 30 are orientated in the direction perpendicular to the plane of the liquid crystal display panel 1.

As shown in FIG. 5, when diffused light exits the light diffusion layer 3c in the backlight unit 3, the polarizing plate 4a emits the light to the liquid crystal display panel 1 as polarized light (linearly polarized light) polarized in the second direction d2.

The liquid crystal layer 30 maintains the polarization condition of the incident light and emits the linearly polarized light polarized in the second direction d2, to the polarizing reflection layer 5. Since the linearly polarized light polarized in the second direction d2 is parallel to the reflection axis of the polarizing reflection layer 5, the light is reflected by the polarizing reflection layer. Thus, the polarizing reflection layer 5 can block the passage of light traveling from the liquid crystal layer 30 into the polarizing reflection layer 5.

Now, description will be given of the optical characteristics of the liquid crystal display device observed when the driving voltage is applied between the pixel electrode 16 and the opposite electrode 22 (an electric field is applied to the liquid crystal layer 30), together with the optical path of light having exited the backlight unit 3.

Figure 6:
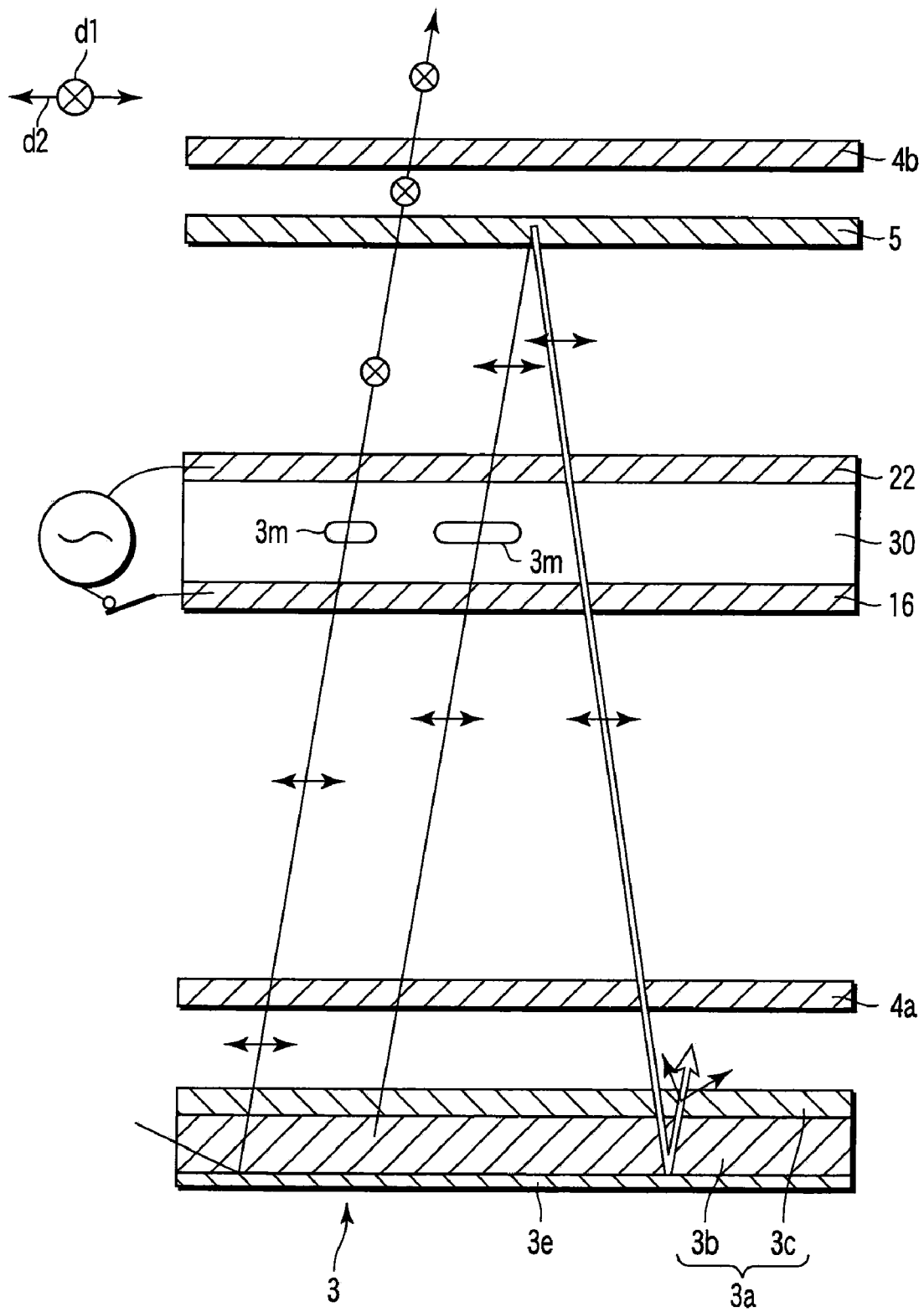
FIG. 6 is a diagram illustrating the optical characteristics and optical path observed when a voltage is applied to the liquid crystal display panel shown in FIG. 1.
Figure 8:
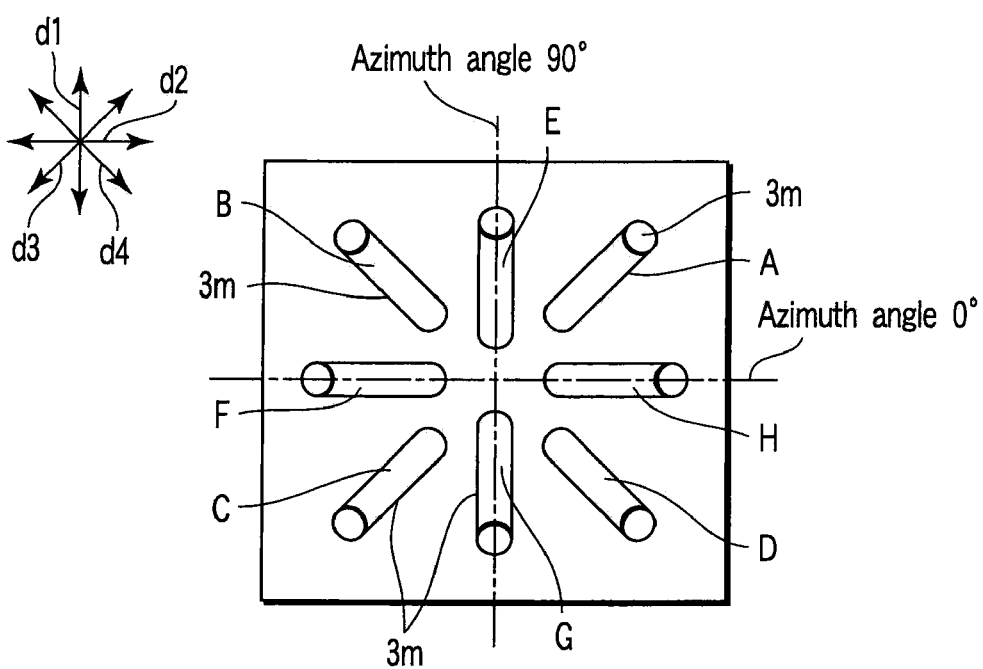
FIG. 8 is a schematic plan view of the liquid crystal display panel comprising a liquid crystal layer as shown in FIG. 6, showing how liquid crystal modules are oriented.

As shown in FIGS. 6 and 8, the liquid crystal molecules 3m in the liquid crystal layer 30 are orientated so as to be inclined in the third direction d3 and the fourth direction d4 with respect to the direction perpendicular to the plane of the liquid crystal display panel 1, as shown by liquid crystal molecules A, B, C, and D. The liquid crystal molecules 3m in the liquid crystal layer 30 are also inclined in the first direction d1 and the second direction d2 with respect to the direction perpendicular to the plane of the liquid crystal display panel 1 as shown by liquid crystal molecules E, F, G, and H.

As shown in FIG. 6, when diffused light exits the light diffusion layer 3c in the backlight unit 3, the polarizing plate 4a emits the light to the liquid crystal display panel 1 as polarized light (linearly polarized light) polarized in the second direction d2.

In an area in which the liquid crystal molecules 3m are oriented in the third direction d3 and the fourth direction d4, the liquid crystal layer 30 inverts the incident linearly polarized light polarized in the second direction d2 through 90° in the first direction d1. The liquid crystal layer 30 thus emits the linearly polarized light polarized in the first direction to the polarizing reflection layer 5. The linearly polarized light polarized in the first direction d1 is orthogonal to the reflection axis of the polarizing reflection layer 5 and to the absorption axis of the polarizing plate 4b. The linearly polarized light polarized in the first direction d1 thus passes through the polarizing reflection layer 5 and the polarizing plate 4b.

In an area in which the liquid crystal molecules 3m are oriented in the first direction d1 and the second direction d2, the liquid crystal layer 30 maintains the polarization condition of the incident light and emits the linearly polarized light polarized in the second direction d2 to the polarizing reflection layer 5. Since the linearly polarized light polarized in the second direction d2 is parallel to the reflection axis of the polarizing reflection layer 5, the light is reflected by the polarizing reflection layer 5. The light reflected by the polarizing reflection layer 5 returns to the backlight unit 3 and is reflected again in the backlight unit. The reflected light exits the backlight unit 3 again. The polarizing reflection layer 5 thus contributes to improving the luminance of the liquid crystal display device.

The present inventor has examined and compared the optical characteristics of the above-described liquid crystal display device with those of a liquid crystal display device in a comparative example. The liquid crystal display device in the comparative example corresponds to the liquid crystal display device according to the present embodiment from which the polarizing reflection layer 5 is omitted. The optical characteristics include the solid black display transmittance (K), solid white display transmittance (W), contrast ratio (W/K), 50% black and 50% white display black transmittance (K50), 50% black and 50% white display white transmittance (W50), and 50% black and 50% white display contrast ratio (W50/K50). The 50% black and 50% white display is provided using a window pattern shaped like a rectangle with sides the length of each of which is 7% of the corresponding side of a display area.

As shown in FIG. 9, the transmittance and contrast ratio of the liquid crystal display device according to the present embodiment are far more excellent than those of the liquid crystal display device in the comparative example.

The liquid crystal display device configured as described above has the liquid crystal display panel 1, the backlight unit 3, the polarizing plate 4a, the polarizing plate 4b, and the polarizing reflection layer 5. The polarizing plate 4b acts as a photodetector having a function of selecting whether or not to transmit incident light according to the polarization condition.

In the liquid crystal display device in the comparative example, the pixel portion P for which the black display is selected uses the polarizing plate 4b to absorb light to provide the black display. In the liquid crystal display device according to the present embodiment, polarized light having exited the pixel portion P for which the white display is selected passes through the polarizing reflection layer 5. Polarized light having exited the pixel portion P for which the black display is selected is reflected by the polarizing reflection layer 5. Even if the polarized light reflectance of the polarizing reflection layer 5 is not 100%, the polarized light is absorbed by the polarizing plate 4b. Thus, the liquid crystal display device according to the present embodiment is prevented from having the contrast characteristic degraded compared to the liquid crystal display device that does not have the polarizing reflection layer 5.

The polarized light reflected by the polarizing reflection layer 5 passes through the polarizing plate 4a and returns to the backlight unit 3. The light having returned to the backlight unit 3 is reflected in the backlight unit and emitted to the liquid crystal display panel 1 again. As described above, the light reflected by the polarizing reflection layer 5 is recycled.

The light having exited the backlight unit 3 is diffused by the light diffusion layer 3c or the like. Thus, in association with the pixel portion P for which the black display is selected, a recycle function acts uniformly within the surface regardless of the display pattern of the black display. The luminance of the display image is improved uniformly within the surface.

For light (external light) traveling from an observer side into the liquid crystal display panel 1, the polarizing plate 4b acts as a polarizer having a function of converting the incident light into linearly polarized light, circularly polarized light, or the like as intended. The light passing through the polarizing plate 4b is the linearly polarized light polarized in the first direction d1 and also passes through the polarizing reflection layer 5. Conversely, a polarization component (the linearly polarized light polarized in the second direction d2) that can be reflected by the polarizing reflection layer 5 is absorbed by the polarizing plate 4b. The external light is not reflected, and the contrast is thus prevented from being degraded.

The liquid crystal display device has the dichroic polarizing plate 4b on the optical path. Even if the polarizing reflection layer 5 has a slightly low polarization degree for a photodetector, the polarizing plate 4b acts as a photodetector.

As described above, the liquid crystal display device obtained offers a high light utilization efficiency and a high display quality.

Now, description will be given of a variation of the liquid crystal display device according to the first embodiment.

Figure 10:
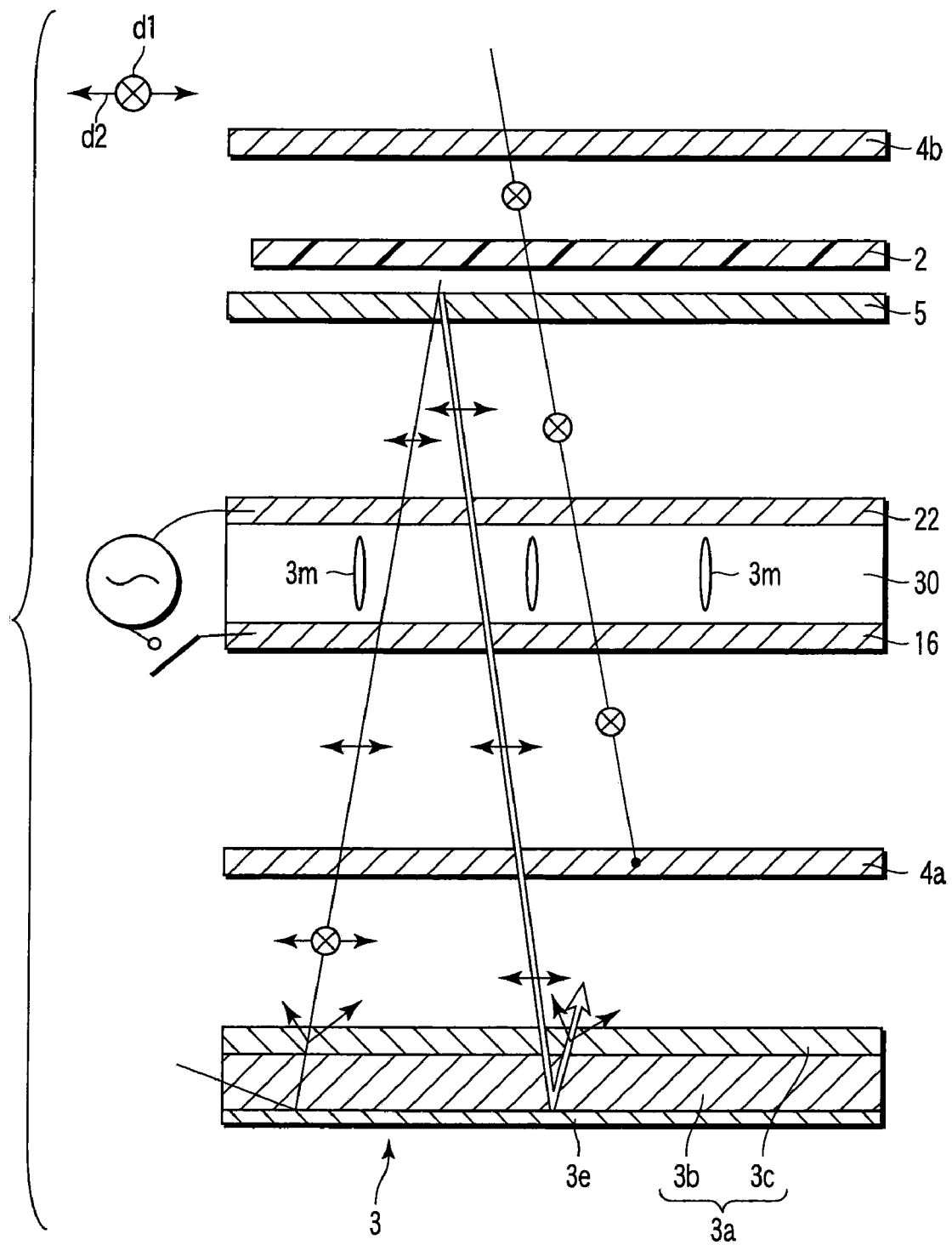
FIG. 10 is a diagram showing a variation of the liquid crystal display device according to the first embodiment and illustrating the optical characteristics and optical path observed when no voltage is applied to the liquid crystal display panel.
Figure 11:
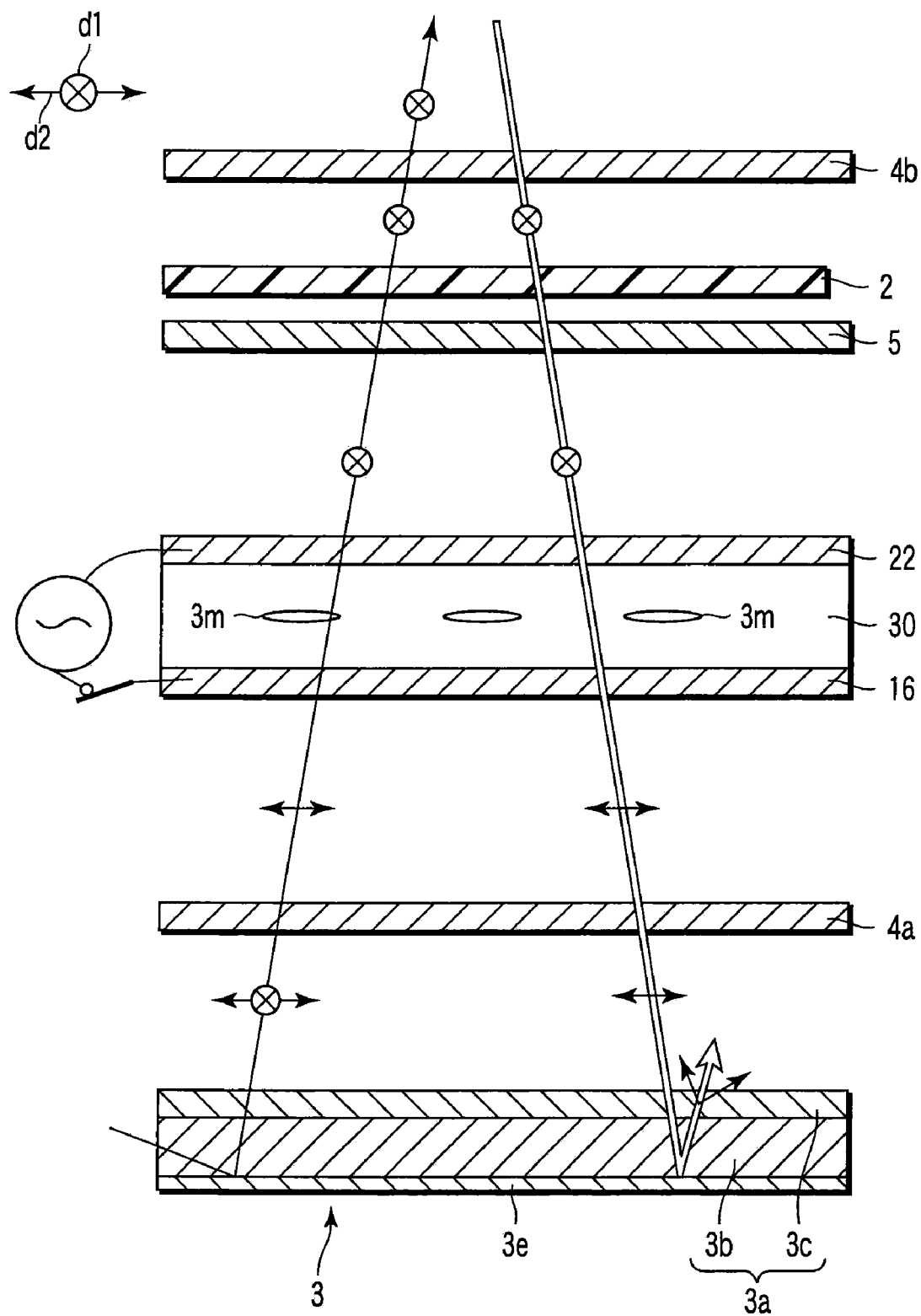
FIG. 11 is a diagram showing another variation of the liquid crystal display device according to the first embodiment, similarly to FIG. 10, and illustrating the optical characteristics and optical path observed when a voltage is applied to the liquid crystal display panel.

As shown in FIGS. 10 and 11, in this variation, the color filter 2 is positioned opposite the liquid crystal layer 30 across the polarizing reflection layer 5 and located opposite the polarizing reflection layer 5. The color filter 2 is provided between the polarizing plate 4b and the polarizing reflection layer 5. The remaining part of the configuration of the liquid crystal display device is the same as that in the first embodiment. The same components as those of the first embodiment are denoted by the same reference numerals and the detailed description of these components is omitted.

First, description will be given of the optical characteristics of the liquid crystal display device observed when the driving voltage is not applied between the pixel electrode 16 and the opposite electrode 22 (no electric field is applied to the liquid crystal layer 30), together with the optical path of light having exited the backlight unit 3.

As shown in FIG. 10, when diffused light exits the light diffusion layer 3c in the backlight unit 3, the polarizing plate 4a emits the light to the liquid crystal display panel 1 as polarized light (linearly polarized light) polarized in the second direction d2.

The liquid crystal layer 30 maintains the polarization condition of the incident light and emits the linearly polarized light polarized in the second direction d2, to the polarizing reflection layer 5. Since the linearly polarized light polarized in the second direction d2 is parallel to the reflection axis of the polarizing reflection layer 5, the light is reflected by the polarizing reflection layer 5. Thus, the polarizing reflection layer 5 can block the light traveling from the liquid crystal layer 30 into the polarizing reflection layer 5.

When external light enters the liquid crystal display device, the polarizing plate 4b emits the light to the color filter 2 as polarized light (linearly polarized light) polarized in the first direction d1. The color filter 2, the polarizing reflection layer 5, and the liquid crystal layer 30 maintain the polarization condition of the incident light and emit the linearly polarized light polarized in the first direction d1, to the polarizing plate 4a. Thus, the polarizing plate 4a can block the light traveling from the liquid crystal layer 30 into the polarizing plate 4a.

Now, description will be given of the optical characteristics of the liquid crystal display device observed when the driving voltage is applied between the pixel electrode 16 and the opposite electrode 22 (an electric field is applied to the liquid crystal layer 30), together with the optical path of light having exited the backlight unit 3.

As shown in FIG. 11, the liquid crystal molecules 3m in the liquid crystal layer 30 are orientated so as to be inclined in the third direction d3 and the fourth direction d4 with respect to the direction perpendicular to the plane of the liquid crystal display panel 1. Although not shown in FIG. 11, the liquid crystal molecules 3m in the liquid crystal layer 30 are also inclined in the first direction d1 and the second direction d2 with respect to the direction perpendicular to the plane of the liquid crystal display panel 1.

When diffused light exits the light diffusion layer 3c in the backlight unit 3, the polarizing plate 4a emits the light to the liquid crystal display panel 1 as polarized light (linearly polarized light) polarized in the second direction d2.

In an area in which the liquid crystal molecules 3m are oriented in the third direction d3 and the fourth direction d4, the liquid crystal layer 30 inverts the incident linearly polarized light polarized in the second direction d2 through 90° in the first direction d1. The liquid crystal layer 30 thus emits the linearly polarized light polarized in the first direction to the polarizing reflection layer 5. The linearly polarized light polarized in the first direction d1 is orthogonal to the reflection axis of the polarizing reflection layer 5 and to the absorption axis of the polarizing plate 4b. The linearly polarized light polarized in the first direction d1 thus passes through the polarizing reflection layer 5 and the polarizing plate 4b.

When external light enters the liquid crystal display device, the polarizing plate 4b emits the light to the color filter 2 as polarized light (linearly polarized light) polarized in the first direction d1. The color filter 2 and the polarizing reflection layer 5 maintain the polarization condition of the incident light and emit the linearly polarized light polarized in the first direction d1, to the liquid crystal display panel 1. In an area in which the liquid crystal molecules 3m are oriented in the third direction d3 and the fourth direction d4, the liquid crystal layer 30 inverts the incident linearly polarized light polarized in the first direction d1 through 90° in the second direction d2. The liquid crystal layer 30 thus emits the linearly polarized light polarized in the second direction to the polarizing plate 4a.

Since the linearly polarized light polarized in the second direction d2 is orthogonal to the absorption axis of the polarizing plate 4a, the light passes through the polarizing plate 4a and then enters the backlight unit 3. The light is then reflected in the backlight unit. The reflected light exits the backlight unit 3, contributing to improving the luminance of the liquid crystal display device.

Although not shown, in an area in which the liquid crystal molecules 3m are oriented in the first direction d1 and the second direction d2, the liquid crystal layer 30 maintains the polarization condition of the incident light and emits the linearly polarized light polarized in the second direction d2 to the polarizing reflection layer 5. Since the linearly polarized light polarized in the second direction d2 is parallel to the reflection axis of the polarizing reflection layer 5, the light is reflected by the polarizing reflection layer 5. The light reflected by the polarizing reflection layer 5 returns to the backlight unit 3 and is reflected again in the backlight unit. The reflected light exits the backlight unit 3 again. The polarizing reflection layer 5 thus contributes to improving the luminance of the liquid crystal display device.

The present inventor has examined the optical characteristics of the liquid crystal display device according to the variation. The results of the examination indicate that the liquid crystal display device according to the variation offers optical characteristics equivalent to or more excellent than those of the liquid crystal display device according to Embodiment 1, that is, optical characteristics exhibiting values equivalent to or greater than those shown in FIG. 9.

Now, description will be given of the effects of the provision of the color filter 2 between the polarizing plate 4b and the polarizing reflection layer 5, together with conventional problems.

First, if the color filter 2 is provided between the polarizer and the photodetector, the polarized light having entered the color filter is disrupted to some degree by the color filter. The contrast characteristic is thus degraded. A pigment is dispersed in the color filter 2. The polarized light disruption phenomenon (hereinafter referred to as depolarization) caused by the color filter 2 is equal to about 1/1000 to 1/2000. If the depolarization is 1/1000, when a liquid crystal display device without the color filter 2 has a contrast ratio of 1000:1, a liquid crystal display device with the color filter 2 has a contrast ratio equal to the reciprocal of 1/1,000+1/1,000, that is, 500:1.

To solve the depolarization problem, the color filter 2 of the liquid crystal display device according to the variation is located outside the polarizer and the photodetector.

As described above, the liquid crystal display device according to the variation configured as described above has the liquid crystal display panel 1, the color filter 2, the backlight unit 3, the polarizing plate 4a, the polarizing plate 4b, and the polarizing reflection layer 5. The variation can thus exert effects similar to those of the above-described first embodiment.

The color filter 2 is provided between the polarizing plate 4b and the polarizing reflection layer 5. The color filter 2 is thus positioned on the optical path outside the polarizing reflection layer 5, which functions as a photodetector. Thus, even though the color filter 2 causes the depolarization to disrupt the incident polarized light, the characteristics of the black display are not affected. The contrast characteristic can thus be inhibited from being degraded.

As described above, the liquid crystal display device obtained offers a high light utilization efficiency and a high display quality.

Now, description will be given of another variation of the liquid crystal display device according to the first embodiment.

Figure 12:
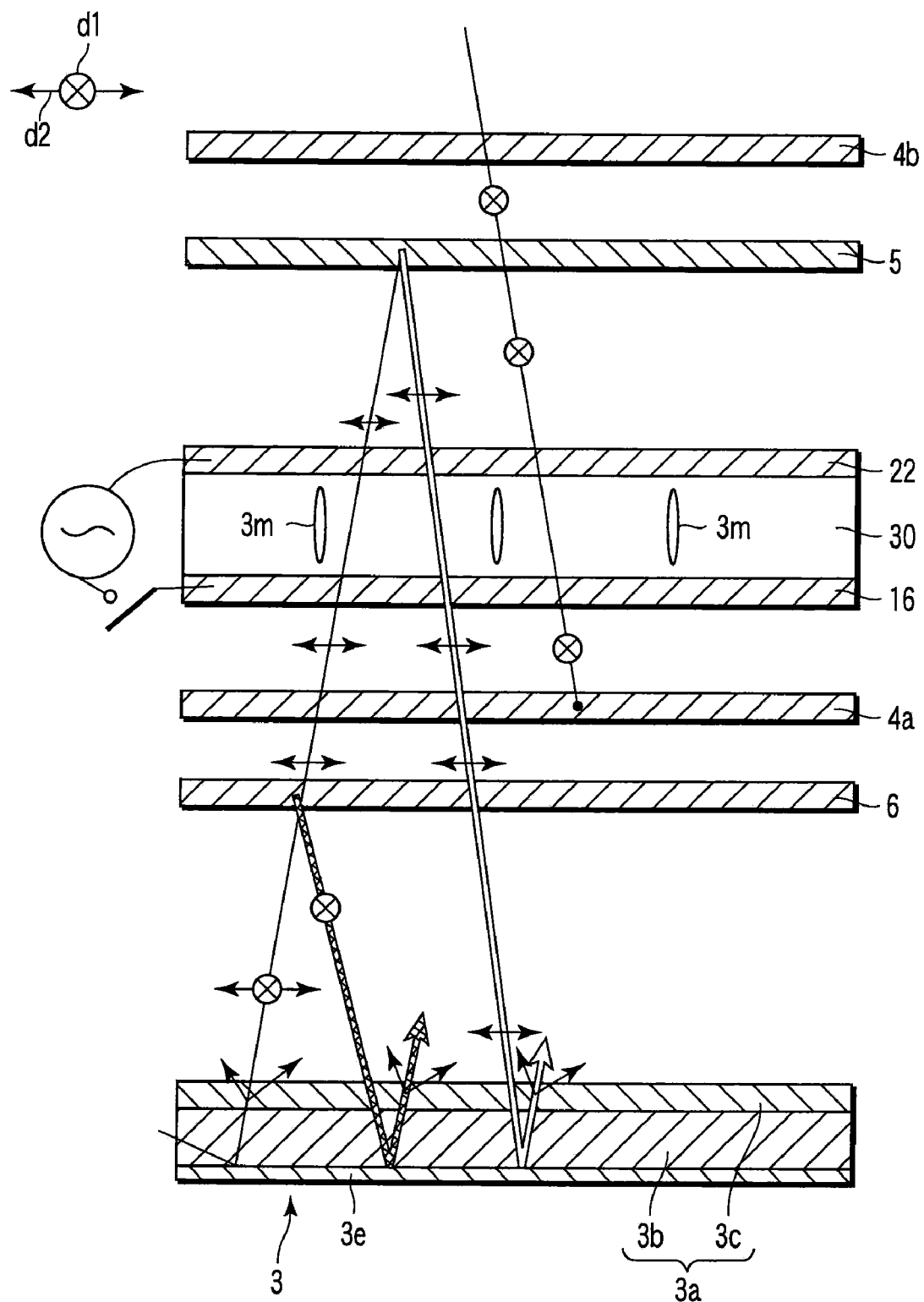
FIG. 12 is a diagram showing another variation of the liquid crystal display device according to the first embodiment and illustrating the optical characteristics and optical path observed when no voltage is applied to the liquid crystal display panel.
Figure 13:
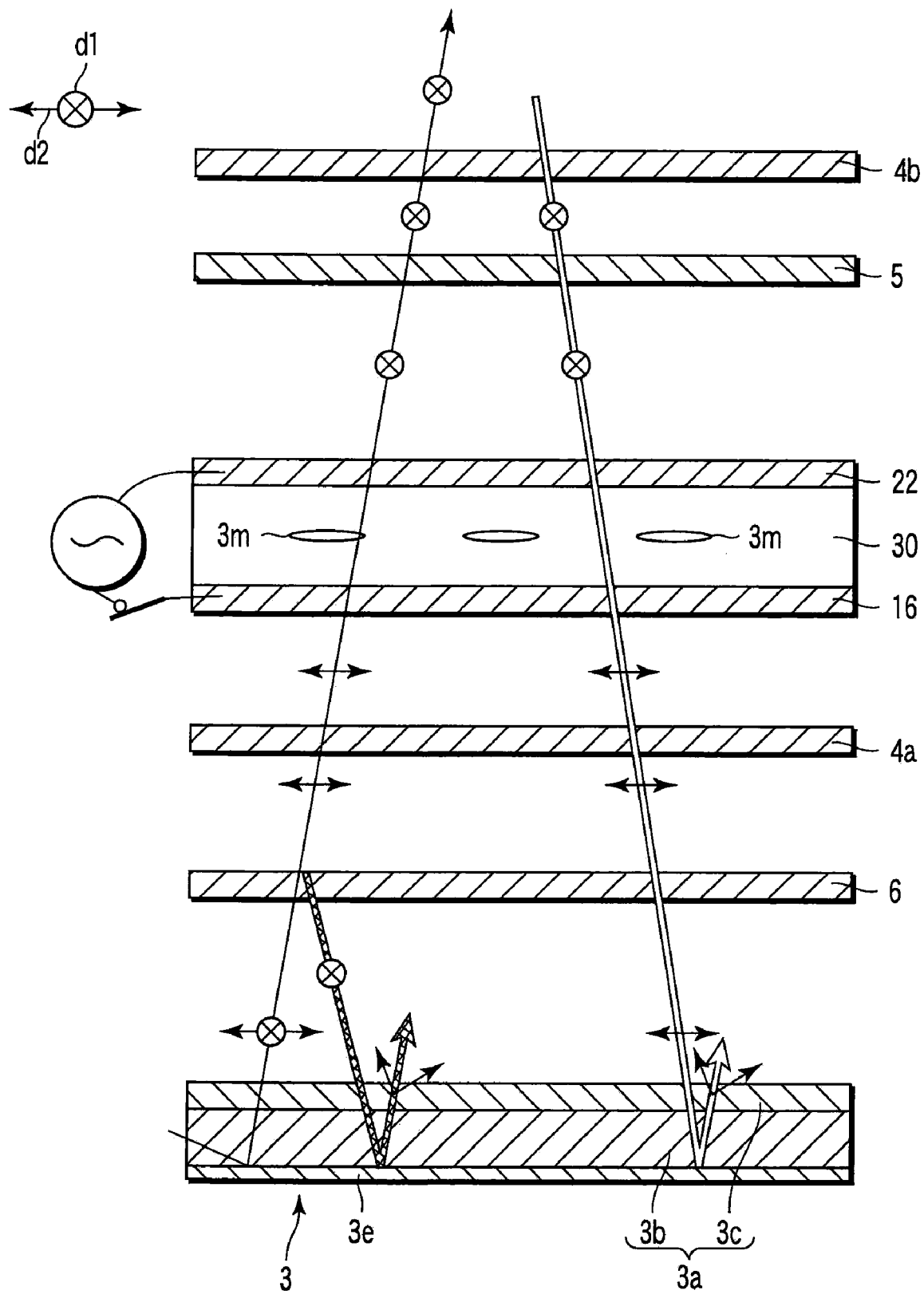
FIG. 13 is a diagram showing another variation of the liquid crystal display device according to the first embodiment, similarly to FIG. 12, and illustrating the optical characteristics and optical path observed when a voltage is applied to the liquid crystal display panel.

As shown in FIGS. 12 and 13, in this variation, the liquid crystal display device further comprises a polarizing reflection layer 6 as an another polarizing reflection layer.

The polarizing reflection layer 6 is positioned opposite the liquid crystal layer 30 across the polarizing plate 4a and located opposite the polarizing plate 4a. The polarizing reflection layer 6 reflects linearly polarized light parallel to the direction of the absorption axis of the polarizing plate 4a. The polarizing reflection layer 6 is located between the polarizing plate 4a and the backlight unit 3.

In this variation, the polarizing reflection layer 6 is laminated to an outer surface of the polarizing plate 4a and has a reflection axis parallel to the first direction d1. Thus, the polarizing reflection layer 5 reflects linearly polarized light polarized in the first direction d1. The polarizing reflection layer 6 is formed of DBEF (manufactured by 3M) using a base film with almost no phase difference. The polarizing reflection layer 6 may be configured without the base film by sticking the base material of DBEF directly to the polarizing plate 4a.

In the variation, the remaining part of the configuration of the liquid crystal display device is the same as that in the first embodiment. The same components of the variation as those of the first embodiment are denoted by the same reference numerals and the detailed description of these components is omitted.

Now, description will be given of the optical characteristics of the liquid crystal display device observed when the driving voltage is not applied between the pixel electrode 16 and the opposite electrode 22 (no electric field is applied to the liquid crystal layer 30), together with the optical path of light having exited the backlight unit 3.

As shown in FIG. 12, when diffused light exits the light diffusion layer 3c in the backlight unit 3, the polarizing reflection layer 6 transmits and reflects the light. That is, the polarizing reflection layer 6 transmits and emits the linearly polarized light polarized in the second direction d2 to the polarizing plate 4a. The polarizing reflection layer 6 also reflects and returns the linearly polarized light polarized in the first direction d1 to the backlight unit 3. The light returned to the backlight unit 3 is reflected in the backlight unit and exits the backlight unit 3 again. The polarizing reflection layer 6 thus contributes to improving the luminance of the liquid crystal display device.

The polarizing plate 4a and the liquid crystal layer 30 maintain the polarization condition of the incident light and emit the linearly polarized light polarized in the second direction d2, to the polarizing reflection layer 5. Since the linearly polarized light polarized in the second direction d2 is parallel to the reflection axis of the polarizing reflection layer 5, the light is reflected by the polarizing reflection layer. Thus, the polarizing reflection layer 5 can block the light traveling from the liquid crystal layer 30 into the polarizing reflection layer 5.

When external light enters the liquid crystal display device, the polarizing plate 4b emits the light to the polarizing reflection layer 5 as polarized light (linearly polarized light) polarized in the first direction d1. The polarizing reflection layer 5 and the liquid crystal layer 30 maintain the polarization condition of the incident light and emit the linearly polarized light polarized in the first direction d1, to the polarizing plate 4a. Thus, the polarizing plate 4a can block the light traveling from the liquid crystal layer 30 into the polarizing plate 4a.

Now, description will be given of the optical characteristics of the liquid crystal display device observed when the driving voltage is applied between the pixel electrode 16 and the opposite electrode 22 (an electric field is applied to the liquid crystal layer 30), together with the optical path of light having exited the backlight unit 3.

As shown in FIG. 13, the liquid crystal molecules 3m in the liquid crystal layer 30 are orientated so as to be inclined in the third direction d3 and the fourth direction d4 with respect to the direction perpendicular to the panel of the liquid crystal display panel 1. Although not shown in FIG. 13, the liquid crystal molecules 3m in the liquid crystal layer 30 are also inclined in the first direction d1 and the second direction d2 with respect to the direction perpendicular to the plane of the liquid crystal display panel 1.

When diffused light exits the light diffusion layer 3c in the backlight unit 3, the polarizing reflection layer 6 transmits and emits the linearly polarized light polarized in the second direction d2 to the polarizing plate 4a. The polarizing reflection layer 6 also reflects and returns the linearly polarized light polarized in the first direction d1 to the backlight unit 3. The polarizing plate 4a emits the light to the liquid crystal display panel 1 as polarized light (linearly polarized light) polarized in the second direction d2.

In an area in which the liquid crystal molecules 3m are oriented in the third direction d3 and the fourth direction d4, the liquid crystal layer 30 inverts the incident linearly polarized light polarized in the second direction d2 through 900 in the first direction d1. The liquid crystal layer 30 thus emits the linearly polarized light polarized in the first direction to the polarizing reflection layer 5. The linearly polarized light polarized in the first direction d1 is orthogonal to the reflection axis of the polarizing reflection layer 5 and to the absorption axis of the polarizing plate 4b. The linearly polarized light polarized in the first direction d1 thus passes through the polarizing reflection layer 5 and the polarizing plate 4b.

When external light enters the liquid crystal display device, the polarizing plate 4b emits the light to the polarizing reflection layer 5 as polarized light (linearly polarized light) polarized in the first direction d1. The polarizing reflection layer 5 maintains the polarization condition of the incident light and emits the linearly polarized light polarized in the first direction d1, to the liquid crystal display panel 1. In an area in which the liquid crystal molecules 3m are oriented in the third direction d3 and the fourth direction d4, the liquid crystal layer 30 inverts the incident linearly polarized light polarized in the first direction d1 through 90° in the second direction d2. The liquid crystal layer 30 thus emits the linearly polarized light polarized in the second direction to the polarizing plate 4a.

Since the linearly polarized light polarized in the second direction d2 is orthogonal to the absorption axis of the polarizing plate 4a and the reflection axis of the polarizing reflection layer 6, the light passes through the polarizing plate 4a and the polarizing reflection layer then enters the backlight unit 3. The light is then reflected in the backlight unit. The reflected light exits the backlight unit 3, contributing to improving the luminance of the liquid crystal display device.

Although not shown, in an area in which the liquid crystal molecules 3m are oriented in the first direction d1 and the second direction d2, the polarizing reflection layer 6 transmits and emits the linearly polarized light polarized in the second direction d2 to the polarizing plate 4a. The polarizing reflection layer 6 also reflects and returns the linearly polarized light polarized in the first direction d1 to the backlight unit 3. In the area in which the liquid crystal molecules 3m are oriented in the first direction d1 and the second direction d2, the liquid crystal layer 30 maintains the polarization condition of the incident light and emits the linearly polarized light polarized in the second direction d2 to the polarizing reflection layer 5.

Since the linearly polarized light polarized in the second direction d2 is parallel to the reflection axis of the polarizing reflection layer 5, the light is reflected by the polarizing reflection layer 5. The light reflected by the polarizing reflection layer 5 returns to the backlight unit 3 and is reflected again in the backlight unit. The reflected light exits the backlight unit 3 again. The polarizing reflection layers 5 and 6 thus contribute to improving the luminance of the liquid crystal display device.

The present inventor has examined the optical characteristics of the liquid crystal display device according to this variation. The results of the examination indicate that the liquid crystal display device according to the variation offers optical characteristics equivalent to or more excellent than those of the liquid crystal display device according to Embodiment 1, that is, optical characteristics exhibiting values equivalent to or greater than those shown in FIG. 9. More specifically, the liquid crystal display device according to the variation exhibits a solid white display transmittance of 14.02% and a solid black display transmittance of 0.031%, as well as a contrast ratio equivalent to that of the liquid crystal display device according to the first embodiment, which does not have the polarizing reflection layer 6. Thus, the liquid crystal display device according to the variation exhibits a white transmittance about 1.5 times as high as that of the liquid crystal display device according to the above-described first embodiment.

Now, description will be given of the effects of the provision of the polarizing reflection layer 6.

The polarizing plate 4a acts inherently as a polarizer and absorbs at least of the incident light in order to achieve polarization. However, in this variation, a linearly polarized light component polarized in the direction of the absorption axis of the polarizing plate 4a is reflected by the polarizing reflection layer 6 for recycling; the linearly polarized light component is contained in the light having exited the backlight unit 3. Thus, the recycle function of the polarizing reflection layer 6 is added to the recycle function of the polarizing reflection layer 5, making it possible to further improve the light utilization efficiency.

As described above, the liquid crystal display device according to this variation configured as described above has the liquid crystal display panel 1, the backlight unit 3, the polarizing plate 4a, the polarizing plate 4b, the polarizing reflection layer 5, and the polarizing reflection layer 6. The variation can thus exert effects similar to those of the above-described first embodiment.

The polarizing reflection layer 6 is provided between the backlight unit 3 and the polarizing plate 4a. The polarizing reflection layer 6 makes it possible to further improve the light utilization efficiency.

As described above, the liquid crystal display device obtained offers a high light utilization efficiency and a high display quality.

Now, description will be given of a liquid crystal display device according to a second embodiment of the present invention.

Figure 14:
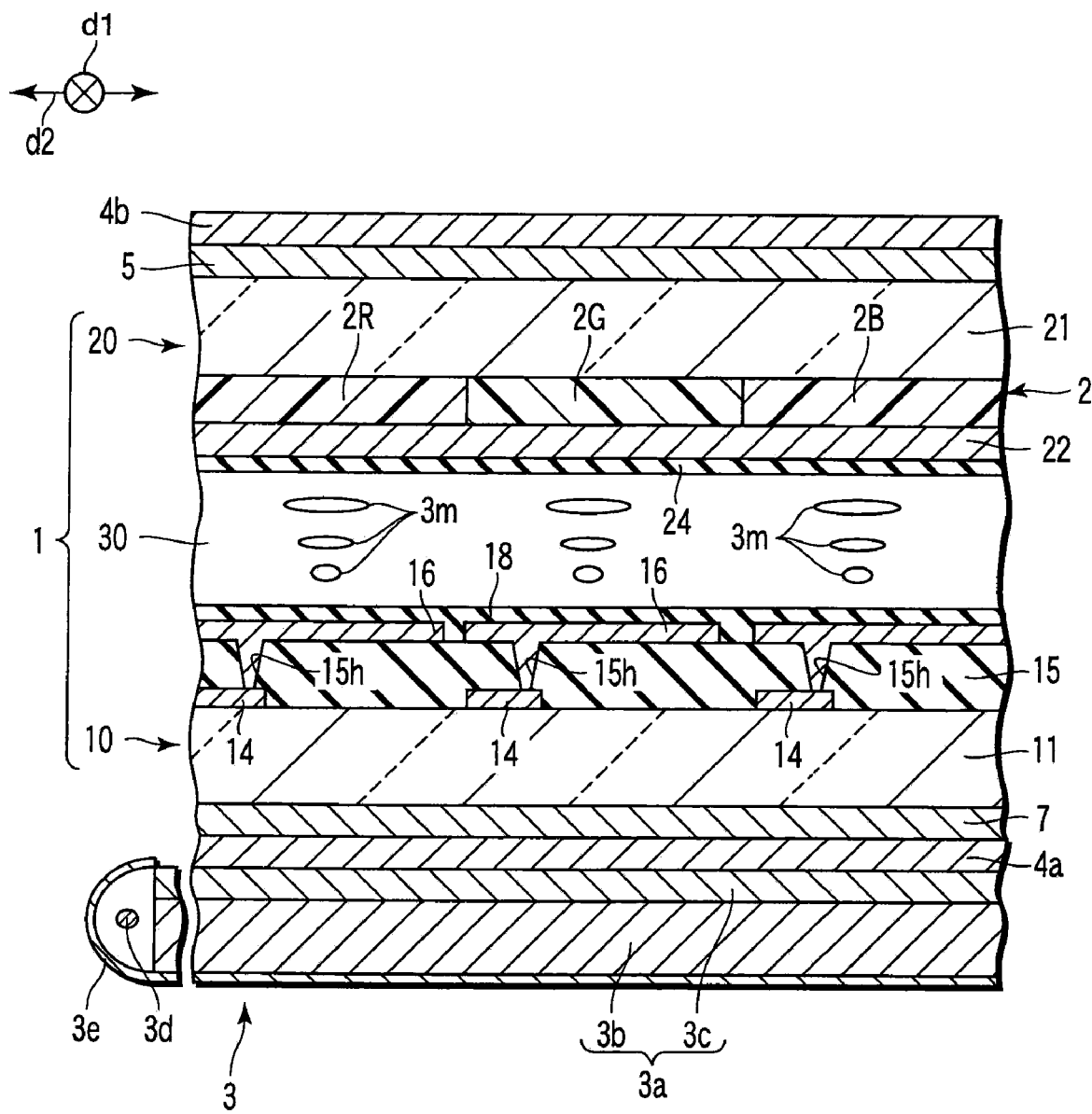
FIG. 14 is a sectional view showing a liquid crystal display device according to a second embodiment.

As shown in FIG. 14, the liquid crystal display device comprises the liquid crystal display panel 1, the color filter 2, the backlight unit 3, the polarizing plate 4a, the polarizing plate 4b, the polarizing reflection layer 5, the control portion 9, and a polarizing reflection layer 7 as an another polarizing reflection layer.

In the present embodiment, each of the alignment films 18 and 24 is formed of a horizontal alignment film. Each of the alignment films 18 and 24 is formed using AL3456 (manufactured by JSR). The alignment film 18 is subjected to rubbing in the first direction d1. The alignment film 24 is subjected to rubbing in the second direction d2. The liquid crystal layer 30 exhibits dielectric constant anisotropy formed by a positive nematic liquid crystal. In the present embodiment, the liquid crystal layer 30 is formed using ZLI4792 (manufactured by Merck Ltd., Japan) to which 0.1 wt % of S811 (manufactured by Merck Ltd., Japan) is added as a chiral material.

The liquid crystal layer 30 has And set to 470 nm at a wavelength of 550 nm. With no electric field applied to the liquid crystal layer 30, the liquid crystal layer exhibits an angle of rotation of about 90°. With a sufficient electric field applied to the liquid crystal layer, the liquid crystal layer exhibits an angle of rotation of 0°.

As described above, the display mode of the liquid crystal display panel 1 is the TN mode. With no electric field applied to the liquid crystal layer 30, the liquid crystal molecules 3*m* are oriented so as to be twisted through 90°. With an electric field applied to the liquid crystal layer 30, the liquid crystal molecules 3*m* are oriented in the direction perpendicular to the plane of the liquid crystal display panel 1.

The polarizing reflection layer 5 is formed similarly to that in the above-described first embodiment. The polarizing reflection layer 5 has a polarization reflectance of almost 100% for a visible light wavelength.

The polarizing reflection layer 7 is located between the liquid crystal display panel 1 and the polarizing plate 4*a*. The polarizing reflection layer 7 reflects linearly polarized light that is parallel to the direction of a transmission axis of the polarizing plate 4*a*. The polarizing reflection layer 7 is formed by sticking DBEF (manufactured by 3M) to the outer surface of the array substrate 10 via a paste. In the present embodiment, the polarizing reflection layer 7 has a refection axis parallel to the second direction d2. The polarizing reflection layer 7 thus reflects the linearly polarized light polarized in the second direction d2. Here, the polarizing reflection layer 7 has a polarization reflectance of 70% for the visible light wavelength. The polarizing reflection layer 7 may be formed using a base film with almost no phase difference.

The control portion 9 applies the driving voltage between the pixel electrode 16 and the opposite electrode 22 in association with the display condition of the liquid crystal display panel 1. When the liquid crystal display panel 1 is in the black display condition, the control portion 9 applies the driving voltage to the liquid crystal display panel. When the liquid crystal display panel 1 is in the white display condition, the control portion 9 does not apply the driving voltage to the liquid crystal display panel.

The remaining part of the configuration of the liquid crystal display device according to the present embodiment is the same as that according to the first embodiment except that the liquid crystal display device is formed without using the protrusions 17 and 23. The same components of the present embodiment as those of the first embodiment are denoted by the same reference numerals and the detailed description of these components is omitted.

Now, description will be given of the optical characteristics of the liquid crystal display device observed when the driving voltage is applied between the pixel electrode 16 and the opposite electrode 22 (an electric field is applied to the liquid crystal layer 30), together with the optical path of light having exited the backlight unit 3.

Figure 15:
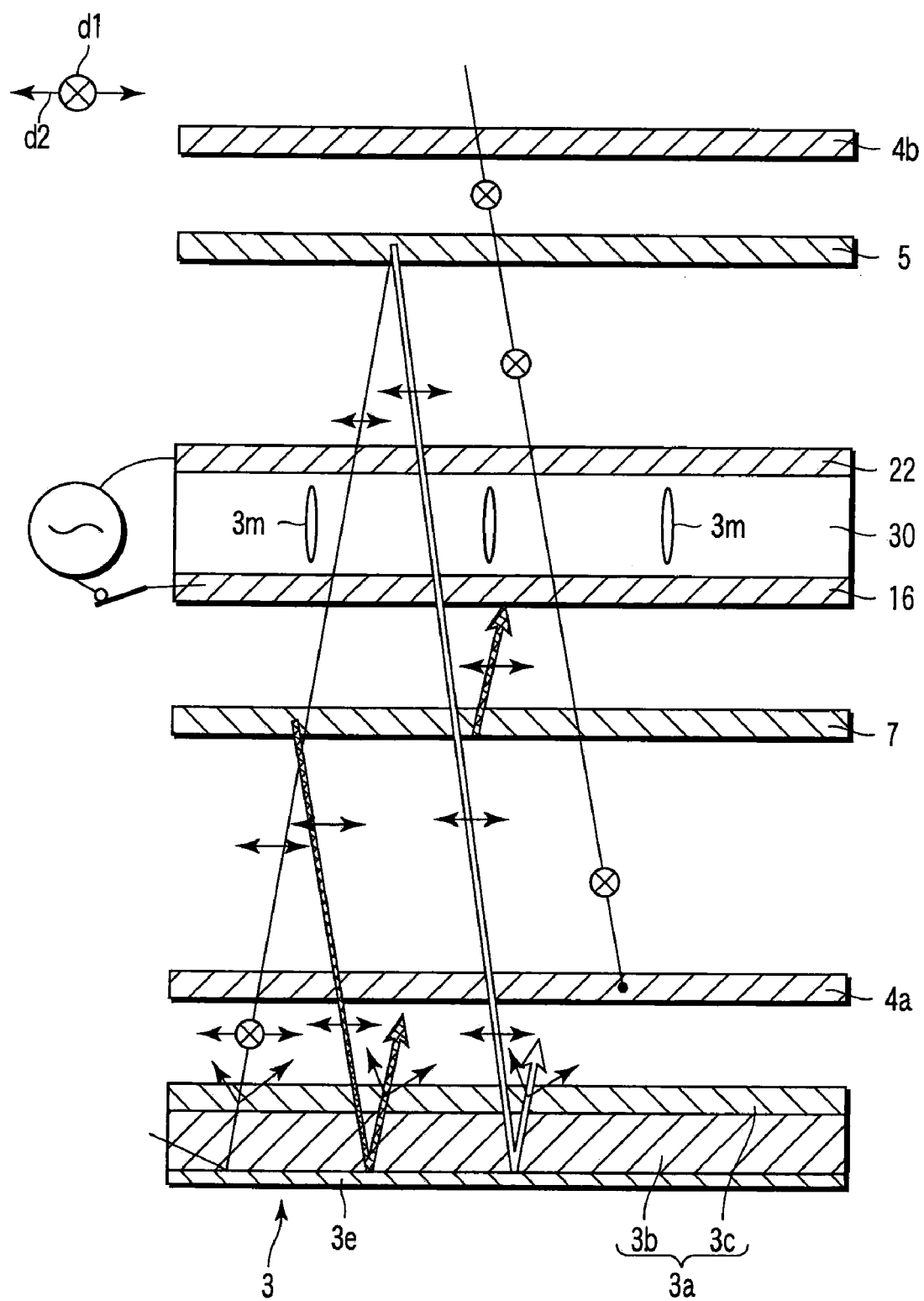
FIG. 15 is a diagram illustrating the optical characteristics and optical path observed when a voltage is applied to a liquid crystal display panel shown in FIG. 14.

As shown in FIG. 15, when diffused light exits the light diffusion layer 3*c* in the backlight unit 3, the polarizing plate 4*a* emits the light to the polarizing reflection layer 7 as polarized light (linearly polarized light) polarized in the second direction d2. The polarizing reflection layer 7 transmits and emits the linearly polarized light polarized in the second direction d2 to the liquid crystal display panel 1, which then reflects the linearly polarized light. Thus, the polarizing reflection layer 7 can block part of the light traveling from the polarizing reflection layer 7 into the liquid crystal layer 30.

When the linearly polarized light polarized in the second direction d2 enters the liquid crystal layer 30, the liquid crystal layer 30 maintains the polarization condition of the incident light and emits the linearly polarized light polarized in the second direction d2, to the polarizing reflection layer 5. Since the linearly polarized light polarized in the second direction d2 is parallel to the reflection axis of the polarizing reflection layer 5, the light is reflected by the polarizing reflection layer. Thus, the polarizing reflection layer 5 can block the light traveling from the liquid crystal layer 30 into the polarizing reflection layer 5.

When external light enters the liquid crystal display device, the polarizing plate 4*b* emits the light to the polarizing reflection layer 5 as polarized light (linearly polarized light) polarized in the first direction d1. The polarizing reflection layer 5, the liquid crystal layer 30, and the polarizing reflection layer 7 maintain the polarization condition of the incident light and emit the linearly polarized light polarized in the first direction d1, to the polarizing plate 4*a*. Thus, the polarizing plate 4*a* can block the light traveling from the liquid crystal layer 30 into the polarizing plate 4*a*.

Now, description will be given of the optical characteristics of the liquid crystal display device observed when the driving voltage is not applied between the pixel electrode 16 and the opposite electrode 22 (no electric field is applied to the liquid crystal layer 30), together with the optical path of light having exited the backlight unit 3.

As shown in FIG. 16, when diffused light exits the light diffusion layer 3*c* in the backlight unit 3, the polarizing plate 4*a* emits the light to the polarizing reflection layer 7 as polarized light (linearly polarized light) polarized in the second direction d2. The polarizing reflection layer 7 transmits and emits the linearly polarized light polarized in the second direction d2 to the liquid crystal display panel 1, which then reflects the linearly polarized light. The reflected light returns to the backlight unit 3 via the polarizing plate 4*a* and exits the backlight unit 3 again. The polarizing reflection layer 7 thus contributes to improving the luminance of the liquid crystal display device.

The liquid crystal layer 30 inverts the incident linearly polarized light polarized in the second direction d2 through 90° in the first direction d1. The liquid crystal layer 30 thus emits the linearly polarized light polarized in the first direction to the polarizing reflection layer 5. The linearly polarized light polarized in the first direction d1 is orthogonal to the reflection axis of the polarizing reflection layer 5 and to the absorption axis of the polarizing plate 4*b*. The linearly polarized light polarized in the first direction d1 thus passes through the polarizing reflection layer 5 and the polarizing plate 4*b*.

When external light enters the liquid crystal display device, the polarizing plate 4*b* emits the light to the polarizing reflection layer 5 as polarized light (linearly polarized light) polarized in the first direction d1. The polarizing reflection layer 5 maintains the polarization condition of the incident light and emits the linearly polarized light polarized in the first direction d1, to the liquid crystal display panel 1. The liquid crystal layer 30 inverts the incident linearly polarized light polarized in the first direction d1 through 90° in the second direction d2. The liquid crystal layer 30 thus emits the linearly polarized light polarized in the second direction to the polarizing reflection layer 7.

Since the linearly polarized light polarized in the second direction d2 is parallel to the reflection axis of the polarizing reflection layer 7, the light is emitted to the liquid crystal display panel 1 again to become linearly polarized light polarized in the first direction d1, which then passes through the polarizing reflection layer 5 and the polarizing plate 4b. Part of the linearly polarized light polarized in the second direction d2 passes though the polarizing reflection layer 7 and enters the backlight unit 3 via the polarizing plate 4a. The light having entered the backlight unit 3 exits the backlight unit 3 again. As is apparent from the above description, the polarizing reflection layers 5 and 7 contribute to improving the luminance of the liquid crystal display device.

The present inventor has examined and compared the optical characteristics of the above-described liquid crystal display device with those of a liquid crystal display device in a comparative example. The liquid crystal display device in the comparative example corresponds to the liquid crystal display device according to the present embodiment from which the polarizing reflection layer 5 is omitted. The optical characteristics include the solid black display transmittance (K), solid white display transmittance (W), transmission mode contrast ratio (W/K), a solid black display reflectance (RK), solid white display reflectance (RW), and reflection mode contrast ratio (RW/RK). The solid black display transmittance, the solid white display transmittance, and the transmission mode contrast ratio are values for the transmission mode. The solid black display reflectance, the solid white display reflectance, and the reflection mode contrast ratio are values for the reflection mode.

As shown in FIG. 17, the transmittance and contrast ratio of the liquid crystal display device according to the present embodiment are far more excellent than those of the liquid crystal display device in the comparative example.

Now, description will be given of the effects of the provision of the polarizing reflection layers 5 and 7.

The liquid crystal display device according to the present embodiment has the polarizing reflection layers 5 and 7 and thus has the optimum configuration for application to a semi-transmissive liquid crystal display device.

The polarizing reflection layer 7 reflects the linearly polarized light polarized in the second direction d2, which has exited the backlight unit 3 and passed through the polarizing plate 4a. Unless the reflectance is 100%, part of the light passes through the polarizing reflection layer 7. The transmitted light passes through the polarizing reflection layer 5 and the polarizing plate 4b or is reflected by the polarizing reflection layer 5 depending on the phase difference amount and angle of rotation of the liquid crystal layer 30. The light reflected by the polarizing reflection layer 5 is recycled, improving the light utilization efficiency of the liquid crystal display device. The light reflected by the polarizing reflection layer 7 also passes through the polarizing plate 4a for recycling. This also improves the light utilization efficiency of the liquid crystal display device.

When external light enters the liquid crystal display device, light passing through the polarizing reflection layer 5 tracks an optical path opposite to that tracked by light exiting the backlight unit 3 and passing through the polarizing reflection layer 5 and the polarizing plate 4b. For the white display, the polarization condition of light traveling from the backlight unit 3 into the polarizing reflection layer 7 is such that linearly polarized light is reflected by the polarizing reflection layer 7. The light is thus reflected by the polarizing reflection layer 7. The reflected polarized light is linearly polarized and has an invariable phase. The light thus exits the backlight unit 3 and tracks an optical path similar to that tracked by light passing through the polarizing reflection layer 5 and the polarizing plate 4b. This results in the white display.

A component of external light having passed through the polarizing reflection layer 7 enters the backlight unit 3 and is then reflected in the backlight unit 3. This increases the light intensity of the backlight.

For the pixel portion P set such that light exits the backlight unit 3 and is then reflected by the polarizing reflection layer 5, light having passed through the polarizing reflection layer 5 and further through the liquid crystal layer 30 remains linearly polarized and thus passes though the polarizing reflection layer 7. The light is absorbed by the polarizing plate 4a.

As described above, for the pixel portion P set for the black display, both the light having exited the backlight unit 3 and the incident external light is blocked and prevented from being emitted to the display surface. For the pixel portion P set for the white display, the recycle function is active, and both the light having exited the backlight unit 3 and the incident external light are emitted to the display screen.

The liquid crystal display device configured as described above has the liquid crystal display panel 1, the backlight unit 3, the polarizing plate 4a, the polarizing plate 4b, the polarizing reflection layer 5, and the polarizing reflection layer 7. The liquid crystal display device can thus exert effects similar to those of the above-described first embodiment. The polarizing reflection layer 7 is provided between the liquid crystal display panel 1 and the polarizing plate 4a. The liquid crystal display device thus has the optimum configuration for a semi-transmissive liquid crystal display device.

The polarizing reflection layer 7 has a polarization reflectance of 70% for the visible light wavelength. However, the present invention is not limited to this. The above-described effects can be exerted provided that the polarizing reflection layer 7 has a polarization reflectance of at least 10% and at most 90% for the visible light wavelength.

For the pixel portion P set for the white display, the polarizing reflection layer 7 needs to reflect external light and to transmit part of the light having exited the backlight unit 3. To maximize the utility of the recycle function, in which light passes through or is reflected by the polarizing reflection layer 7 and returns to the backlight unit 3, it is necessary to minimize attenuation resulting from light absorption in the backlight unit. Furthermore, the reflectance of the polarizing reflection layer 7 cannot be increased more than required.

In contrast, when the polarizing reflection layer 7 has an excessively low reflectance, the reflectance for external light is low, and the brightness of the display image is insufficient in an environment with a high illuminance. The present inventor performed subjective evaluations to find that the reflectance of the polarizing reflection layer 7 needs to be at least 10%.

Furthermore, the attenuation in the backlight unit is at least about 10%, including interfacial reflection. As is also apparent from the above description, it is desirable to set the reflectance of the polarizing reflection layer 7 to at least 10% and to set the quantity of light transmitted per operation to at least 10%. Thus, it is optimum to set the polarization reflectance of the polarizing reflection layer 7 to at least 10% and at most 90%.

As described above, the liquid crystal display device obtained offers a high light utilization efficiency and a high display quality.

Now, description will be given of a variation of the liquid crystal display device according to the second embodiment of the present invention.

Figure 18:
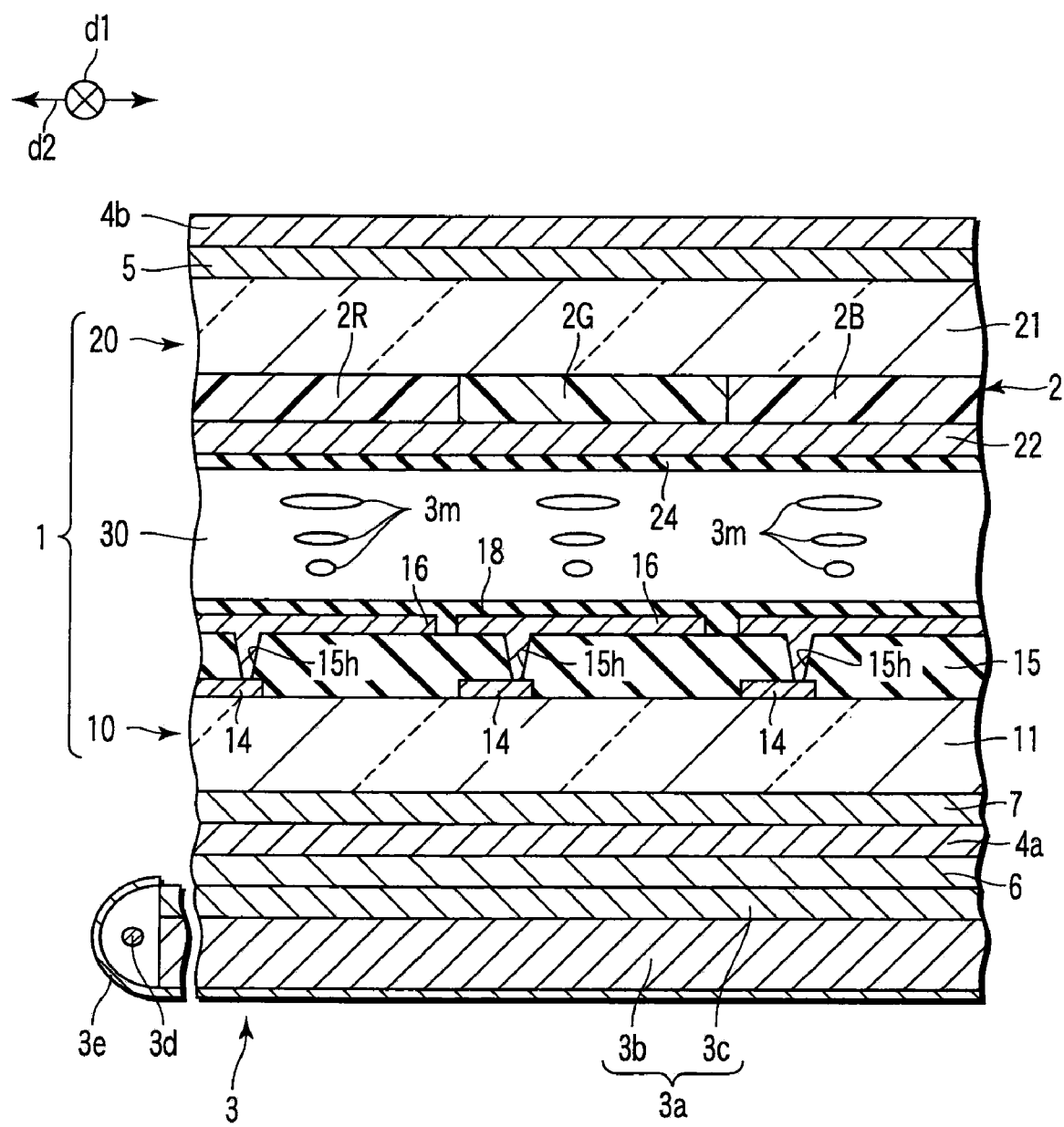
FIG. 18 is a sectional view showing a variation of the liquid crystal display device according to the second embodiment.

As shown in FIG. 18, in this variation, the liquid crystal display device comprises the above-described polarizing reflection layer 6. That is, the liquid crystal display device has the polarizing reflection layer 5 positioned between the liquid crystal layer 30 and the polarizing plate 4b as a polarizing reflection layer, the polarizing reflection layer 7 positioned between the liquid crystal layer 30 and the polarizing plate 4a as another polarizing reflection layer, and the polarizing reflection layer 6 positioned between the backlight unit 3 and the polarizing plate 4a as a third polarizing reflection layer.

The remaining part of the configuration of the liquid crystal display device according to this variation is the same as that according to the second embodiment. The same components of the variation as those of the second embodiment are denoted by the same reference numerals and the detailed description of these components is omitted.

The liquid crystal display device provided by the above-described variation also offers a high light utilization efficiency and a high display quality.

Now, a detailed description will be given of a liquid crystal display device according to a third embodiment of the present invention.

Figure 19:
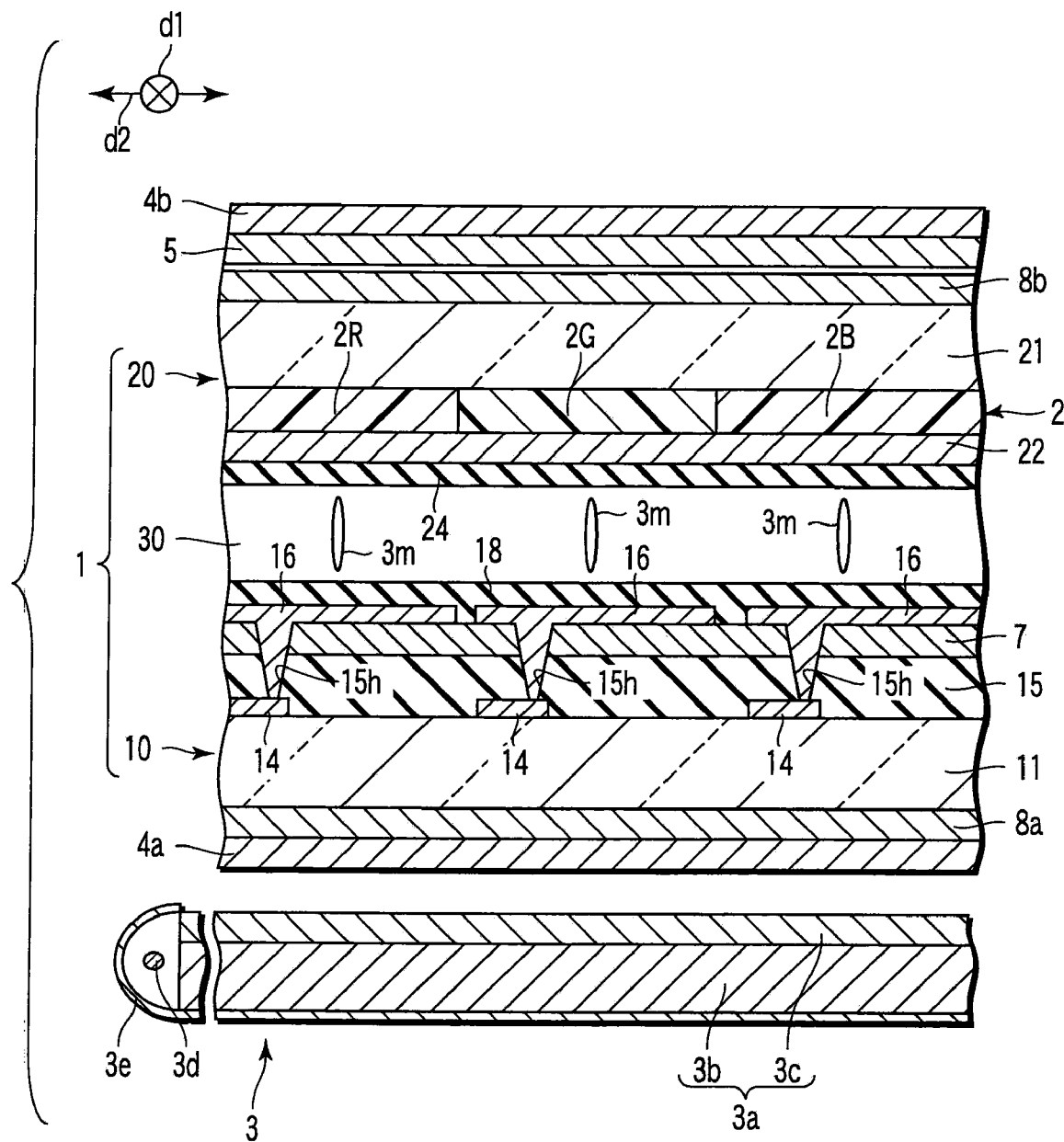
FIG. 19 is a sectional view showing a liquid crystal display device according to a third embodiment.

As shown in FIG. 19, the liquid crystal display device comprises the liquid crystal display panel 1, the color filter 2, the backlight unit 3, the polarizing plate 4a, the polarizing plate 4b, the polarizing reflection layer 5, the polarizing reflection layer 7 as another polarizing reflection layer, a quarter wavelength plate 8a, a quarter wavelength plate 8b as another quarter wavelength plate, and the control portion 9.

In the array substrate 10, the polarizing reflection layer 7 is formed on the interlayer insulating film 15. The pixel electrodes 16 are formed on the polarizing reflection layer 7. Each of the pixel electrodes 16 is electrically connected to the drain electrode 14e of the corresponding TFT 14 via a contact hole 15h formed in the interlayer insulating film 15 and the polarizing reflection layer 7. The polarizing reflection layer 7 will be described below in detail.

In the present embodiment, each of the alignment films 18 and 24 is formed of a vertical alignment film. Each of the alignment films 18 and 24 is formed using JALS-204-R14 (manufactured by JSR). The alignment films 18 and 24 are subjected to rubbing in the second direction d2. The directions of the rubbing are anti-parallel. In other words, the directions of the rubbing are opposite to each other.

The liquid crystal layer 30 exhibits dielectric constant anisotropy formed by a negative nematic liquid crystal. In the present embodiment, the liquid crystal layer 30 is formed using MLC2038 (manufactured by Merck Ltd., Japan). The liquid crystal layer 30 has Δnd set to 350 nm at a wavelength of 550 nm. With no electric field applied to the liquid crystal layer 30, the liquid crystal layer exhibits a phase difference amount of 0. With a sufficient electric field applied to the liquid crystal layer, the liquid crystal layer exhibits a phase difference amount equal to the half of the incident light wavelength.

As described above, the display mode of the liquid crystal display panel 1 is the pixel orientation dividing VA mode. With no electric field applied to the liquid crystal layer 30, the liquid crystal molecules 3m are oriented in the direction perpendicular to the plane of the liquid crystal display panel 1. The orientation is controlled such that with an electric field applied to the liquid crystal layer 30, the liquid crystal molecules 3m are inclined in the direction parallel to the plane of the liquid crystal display panel 1. More specifically, the orientation is controlled such that the liquid crystal molecules 3m are inclined in the second direction d2.

The polarizing plate 4a is located opposite the liquid crystal layer 30. The polarizing plate 4a is positioned between the array substrate 10 and the backlight unit 3 and located opposite the outer surface of the array substrate. The polarizing plate 4a has an absorption axis parallel to a left-handed direction of 45° to the rubbing direction. In the present embodiment, the polarizing plate 4a has an absorption axis in the third direction d3. The polarizing plate 4a is laminated to an outer surface of the quarter wavelength plate 8a. The polarizing plate 4a is formed using SEG1425 (manufactured by NITTO DENKO CORPORATION).

The polarizing reflection layer 5 is positioned opposite the polarizing plate 4a across the liquid crystal layer 30 and located opposite the liquid crystal layer. More specifically, the polarizing reflection layer 5 is positioned opposite the polarizing plate 4a across the liquid crystal display panel 1 and located opposite the opposite substrate 20. The polarizing reflection layer 5 reflects linearly polarized light polarized in one direction parallel to the plane of the liquid crystal display panel 1. In the present embodiment, the polarizing reflection layer 5 is laminated to an outer surface of the quarter wavelength plate 8b, and has a reflection axis parallel to the fourth direction d4. Thus, the polarizing reflection layer 5 reflects linearly polarized light polarized in the fourth direction d4. The polarizing reflection layer 5 is formed using DBEF (manufactured by 3M) having almost no phase difference.

The polarizing plate 4b is positioned opposite the liquid crystal layer 30 (liquid crystal display panel 1) across the polarizing reflection layer 5 and located opposite the polarizing reflection layer 5. The polarizing plate 4b has an absorption axis parallel to the polarizing direction of the linearly polarized light reflected by the polarizing reflection layer 5. The polarizing plate 4b has an absorption axis parallel to a left-handed direction of 45° to the rubbing direction. In the present embodiment, the polarizing plate 4b is laminated to the outer surface of the polarizing reflection layer 5, and has an absorption axis parallel to the fourth direction d4. The polarizing plate 4b is formed using SEG1425 (manufactured by NITTO DENKO CORPORATION).

The quarter wavelength plate 8a is located between the liquid crystal layer 30 and the polarizing plate 4a. More specifically, the quarter wavelength plate 8a is located between the array substrate 10 and the polarizing plate 4a. The quarter wavelength plate 8a is formed of a film (manufactured by NITTO DENKO CORPORATION) obtained by stacking a uniaxially stretched film of Arton resin with a retardation value of 270 nm and a uniaxially stretched film of Arton resin with a retardation value of 140 nm a plurality of times so as to obtain a phase difference equal to a quarter of the wavelength of the entire visible wavelength range.

The quarter wavelength plate 8a has a synthetic optical axis (the total optical axis of the stacked uniaxially stretched films) in a right-handed direction of 45° to the transmission axis of the polarizing plate 4a. In the present embodiment, the quarter wavelength plate 8a is laminated to the outer surface of the array substrate 10 and has a synthetic optical axis parallel to the first direction d1. The quarter wavelength plate 8a functions as a right-handed circularly polarizing plate together with the polarizing plate 4a.

The quarter wavelength plate 8b as another quarter wavelength plate is located between the liquid crystal layer 30 and the polarizing reflection layer 5. More specifically, the quarter wavelength plate 8b is located between the opposite substrate 20 and the polarizing reflection layer 5. The quarter wavelength plate 8b is formed of a film (manufactured by NITTO DENKO CORPORATION) obtained by stacking a uniaxially stretched film of Arton resin with a retardation value of 270 nm and a uniaxially stretched film of Arton resin with a retardation value of 140 nm a plurality of times so as to obtain a phase difference equal to a quarter of the wavelength of the entire visible wavelength range.

The quarter wavelength plate 8b has a synthetic optical axis (the total optical axis of the stacked uniaxially stretched films) in a left-handed direction of 45° to the transmission axis of the polarizing plate 4b. In the present embodiment, the quarter wavelength plate 8b is laminated to the outer surface of the opposite substrate 20 and has a synthetic optical axis parallel to the first direction d1. The quarter wavelength plate 8b functions as a left-handed circularly polarizing plate together with the polarizing plate 4b.

The polarizing reflection layer 7 is located between the liquid crystal layer 30 and the quarter wavelength plate 8a. More specifically, the polarizing reflection layer 7 is positioned between the interlayer insulating film 15 and the pixel electrode 16. The polarizing reflection layer 7 is a circular polarizing reflection layer 5 and reflects circularly polarized light passing through the quarter wavelength plate 8a and then entering the polarizing reflection layer 7 so that the polarity of the reflected circularly polarized light remains unchanged. In the present embodiment, the polarizing reflection layer 7 reflects 70% of right-handed circularly polarized light with respect to the entire visible light wavelength range. The polarizing reflection layer 7 has only to be formed to reflect right-handed or left-handed circularly polarized light as required.

The polarizing reflection layer 7 is obtained by stacking, in a planar orientation, cholesteric liquid crystal polymers (Merck Ltd., Japan) that provide selective reflection of right-handed circularly polarized light over a bandwidth of about 50 nm around a wavelength of 400, 450, 500, 550, 600, 650, or 700 nm. The polarizing reflection layer 7 is controlled such that each layer has an angle of twist of 3,6000 (10 rotations) so as to control the reflectance to 70%. Since the polarizing reflection layer 7 is formed on the inner surface of the substrate, the polarizing reflection layer 7 is oriented by a photo crosslinking material and polymerized by UV irradiation.

The control portion 9 is electrically connected to the liquid crystal display panel 1. The control portion 9 applies the driving voltage to between the pixel electrode 16 and the opposite electrode 22 in association with the display condition of the liquid crystal display panel 1. The application of the driving voltage applies an electric field to the liquid crystal layer 30. When the liquid crystal display panel 1 is in the black display condition, the control portion 9 does not apply the driving voltage to the liquid crystal display panel. When the liquid crystal display panel 1 is in the white display condition, the control portion 9 applies the driving voltage to the liquid crystal display panel.

The remaining part of the configuration of the liquid crystal display device according to the present embodiment is the same as that according to the first embodiment except that the liquid crystal display device is formed without using the protrusions 17 and 23. The same components of the present embodiment as those of the first embodiment are denoted by the same reference numerals and the detailed description of these components is omitted.

Now, description will be given of the optical characteristics of the liquid crystal display device observed when the driving voltage is not applied between the pixel electrode 16 and the opposite electrode 22 (no electric field is applied to the liquid crystal layer 30), together with the optical path of light having exited the backlight unit 3.

As shown in FIG. 20, when diffused light exits the light diffusion layer 3c in the backlight unit 3, the polarizing plate 4a emits the light to the quarter wavelength plate 8a as polarized light (linearly polarized light) polarized in the fourth direction d4. The quarter wavelength plate 8a emits the linearly polarized light polarized in the fourth direction d4 to the polarizing reflection layer 7 as right-handed circularly polarized light. The polarizing reflection layer 7 transmits and emits the right-handed circularly polarized light to the liquid crystal display panel 1, which then reflects the light. Thus, the polarizing reflection layer 7 can block part of the light traveling from the polarizing reflection layer 7 into the liquid crystal layer 30.

When the right-handed circularly polarized light enters the liquid crystal layer 30, the liquid crystal layer 30 maintains the polarization condition of the incident light, and emits the right-handed circularly polarized light to the quarter wavelength plate 8b. The quarter wavelength plate 8b emits the right-handed circularly polarized light to the polarizing reflection layer 5 as linearly polarized light polarized in the fourth direction d4. The linearly polarized light polarized in the fourth direction d4 is parallel to the reflection axis of the polarizing reflection layer 5 and is thus reflected by the polarizing reflection layer 5. Thus, the polarizing reflection layer 5 can block light traveling from the liquid crystal layer 30 into the polarizing reflection layer 5.

When external light enters the liquid crystal display device, the polarizing plate 4b emits the light to the polarizing reflection layer 5 as polarized light (linearly polarized light) polarized in the third direction d3. The polarizing reflection layer 5 maintains the polarization condition of the light, and emits the linearly polarized light polarized in the third direction d3 to the quarter wavelength plate 8b. The quarter wavelength plate 8b emits the linearly polarized light polarized in the third direction d3 to the liquid crystal layer 30 as left-handed circularly polarized light. The liquid crystal layer 30 and the polarizing reflection layer 7 maintains the polarization condition of the incident light, and emits the left-handed circularly polarized light to the quarter wavelength plate 8a.

The quarter wavelength plate 8a emits the left-handed circularly polarized light to the polarizing plate 4a as linearly polarized light polarized in the third direction d3. Thus, the polarizing plate 4a can block light traveling from the liquid crystal layer 30 into the polarizing plate 4a.

Now, description will be given of the optical characteristics of the liquid crystal display device observed when the driving voltage is applied between the pixel electrode 16 and the opposite electrode 22 (an electric field is applied to the liquid crystal layer 30), together with the optical path of light having exited the backlight unit 3.

Figure 21:
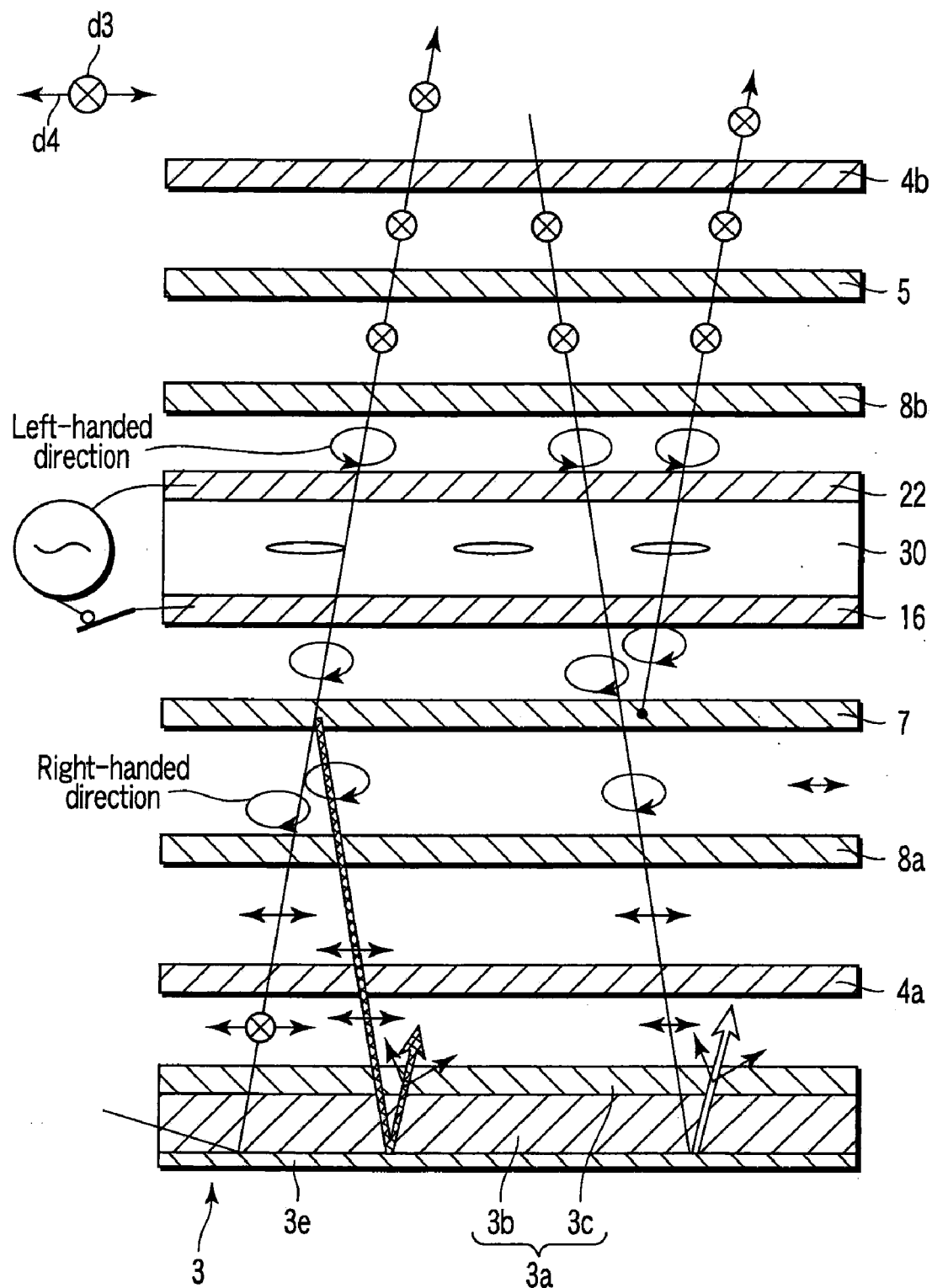
FIG. 21 is a diagram illustrating the optical characteristics and optical path observed when a voltage is applied to the liquid crystal display panel shown in FIG. 19.

As shown in FIG. 21, when diffused light exits the light diffusion layer 3c in the backlight unit 3, the polarizing plate 4a emits the light to the quarter wavelength plate 8a as polarized light (linearly polarized light) polarized in the fourth direction d4. The quarter wavelength plate 8a emits the linearly polarized light polarized in the fourth direction d4 to the polarizing reflection layer 7. The polarizing reflection layer 7 transmits and emits the right-handed circularly polarized light to the liquid crystal display panel 1, which then reflects the circularly polarized light. The reflected light returns to the backlight unit 3 via the polarizing plate 4a and exits the backlight unit 3 again. The polarizing reflection layer 7 thus contributes to improving the luminance of the liquid crystal display device.

The liquid crystal layer 30 emits the incident right-handed circularly polarized light to the quarter wavelength plate 8b as left-handed circularly polarized light. The quarter wavelength plate 8b emits the left-handed circularly polarized light to the polarizing reflection layer 5 as linearly polarized light polarized in the third direction d3. Since the linearly polarized light polarized in the third direction d3 is orthogonal to the reflection axis of the polarizing reflection layer 5 and the absorption axis of the polarizing plate 4b, the light passes through the polarizing reflection layer 5 and the polarizing plate 4.

When external light enters the liquid crystal display device, the polarizing plate 4b emits the light to the polarizing reflection layer 5 as polarized light (linearly polarized light) polarized in the third direction d3. The polarizing reflection layer 5 maintains the polarization condition of the incident light, and emits the linearly polarized light polarized in the third direction d3 to the quarter wavelength plate 8b. The quarter wavelength plate 8b emits the linearly polarized light polarized in the third direction d3 to the liquid crystal display panel 1 as left-handed circularly polarized light. The liquid crystal layer 30 emits the incident left-handed circularly polarized light to the polarizing reflection layer 7 as right-handed circularly polarized light.

The polarizing reflection layer 7 maintains the polarization condition of the incident light, and emits the right-handed circularly polarized light to the quarter wavelength plate 8a. Since the right circularly polarized light is reflected by the polarizing reflection layer 7, the light is emitted to the liquid crystal display panel 1 again. The light thus becomes left-handed circularly polarized light, which is then emitted to the quarter wavelength plate 8b. The quarter wavelength plate 8b emits the light to the polarizing reflection layer 5 as linearly polarized light polarized in the third direction d3. The linearly polarized light polarized in the third direction d3 passes through the polarizing reflection layer 5 and the polarizing plate 4b.

Part of the right-handed circularly polarized light passes through the polarizing reflection layer 7 to the quarter wavelength plate 8. The quarter wavelength plate 8a emits the linearly polarized light polarized in the fourth direction d4 to the polarizing plate 4a. The linearly polarized light polarized in the fourth direction d4 passes though the polarizing plate 4a and enters the backlight unit 3. The light having entered the backlight unit 3 exits the backlight unit 3 again. As is apparent from the above description, the polarizing reflection layers 5 and 7 contribute to improving the luminance of the liquid crystal display device.

The present inventor has examined and compared the optical characteristics of the above-described liquid crystal display device with those of a liquid crystal display device in a comparative example. The liquid crystal display device in the comparative example corresponds to the liquid crystal display device according to the present embodiment from which the polarizing reflection layer 5 is omitted. The optical characteristics include the solid black display transmittance (K), solid white display transmittance (W), transmission mode contrast ratio (W/K), solid black display reflectance (RK), solid white display reflectance (RW), and reflection mode contrast ratio (RW/RK). The solid black display transmittance, solid white display transmittance, and transmission mode contrast ratio are values for the transmission mode. The solid black display reflectance, solid white display reflectance, and reflection mode contrast ratio are values for the reflection mode.

As shown in FIG. 22, the transmittance and contrast ratio of the liquid crystal display device according to the present embodiment are far more excellent than those of the liquid crystal display device in the comparative example. Additionally, since the polarizing reflection layer 7 is formed on the inner surface of the liquid crystal display panel 1 as a circularly polarized light reflection layer, the liquid crystal display device is free from parallax and offers a high definition and a high display quality.

Now, description will be given of the effects of the provision of the polarizing reflection layers 5 and 7.

The liquid crystal display device according to the present embodiment has the polarizing reflection layers 5 and 7 and thus has the optimum configuration for application to a semi-transmissive liquid crystal display device. In particular, the polarizing reflection layer 5 is a component optimum for a liquid crystal display device disclosed in Japanese Patent No. 3015792. Thus, the polarizing reflection layer 5 can selectively reflect right-handed circularly polarized light and left-handed circularly polarized light described in Japanese Patent No. 3015792. This contributes to improving the light utilization efficiency.

In the present embodiment, the liquid crystal display device has the quarter wavelength plates 8a and 8b, and the polarizing reflection layer 7 is a circularly polarized light reflection layer. Thus, the polarizing reflection layer 7 is formed of a polymerized cholesteric liquid crystal or chiral nematic liquid crystal. Moreover, the polarizing reflection layer 7 can be easily formed on the glass substrate. Consequently, the polarizing reflection layer 7 can be formed on the inner surface of the liquid crystal display panel 1 and close to the liquid crystal layer 30. This makes it possible to easily prevent a possible double display phenomenon caused by parallax in the reflection mode.

If the polarizing reflection layer 7 is a circularly polarized light reflection layer, circularly polarized light needs to enter the polarizing reflection layer 7. Thus, the quarter wavelength plate 8a needs to be provided between the polarizing reflection layer 7 and the polarizing plate 4a. It is not easy to locate the quarter wavelength plate adjacent to the liquid crystal layer 30. High costs are required to implement the quarter wavelength plate using a liquid crystal polymer or the like. Thus, the quarter wavelength plate 8a is provided between the polarizing reflection layer 7 and the polarizing plate 4a. The quarter wavelength plate 8b is provided between the polarizing reflection layer 5 and the liquid crystal layer 30.

Furthermore, the liquid crystal layer 30 is desirably adapted to mainly guide circularly polarized light. Thus, the liquid crystal layer 30 preferably uses a display mode in which the amount of deviation in the phase of incident light is controlled by an electric field. Specific examples of the display mode include the VA mode, a homogeneous (HOMO) mode, an in-plane switching (IPS) mode, a ferroelectric (FLC) liquid crystal mode, a hybrid alignment (HAN) mode, and a twisted nematic electrically controlled birefringence (TN-ECB) mode.

Now, description will be given of the effect of polymerizing a cholesteric liquid crystal to form the polarizing reflection layer 7.

When the polarizer and the photodetector are provided on the outer surfaces of the substrates (glass substrates 11 and 21) used to form the liquid crystal display device, parallax occurs which corresponds to the thickness of the polarizer and the photodetector including the substrates. Furthermore, when the pixel portions P have a small size, the color display varies between when the display screen is viewed from the front and when the display screen is viewed from an oblique direction.

To avoid this parallax problem, the polarizing reflection layer (photodetector) may be formed on the inner surface of the substrate. In the present embodiment, the polarizing reflection layer 7 can be formed on the inner surface of the substrate without degrading the optical characteristics. Thus, the display quality can be improved.

The liquid crystal display device configured as described above has the liquid crystal display panel 1, the backlight unit 3, the polarizing plate 4a, the polarizing plate 4b, the polarizing reflection layer 5, and the polarizing reflection layer 7. Thus, the liquid crystal display device can exert effects similar to those of the above-described first embodiment. The polarizing reflection layer 7 is provided between the liquid crystal display panel 1 and the polarizing plate 4a. This provides the optimum configuration for a semi-transmissive liquid crystal display device. Since the polarizing reflection layer 7 is formed on the inner surface of the liquid crystal display panel 1, the liquid crystal display device is free from parallax and offers a high definition and a high display quality.

The polarizing reflection layer 7 has a polarization reflectance of 70% for the entire visible light wavelength range. However, the present invention is not limited to this. The above-described effects can be exerted provided that the polarizing reflection layer 7 has a polarization reflectance of at least 10% and at most 90% for the entire visible light wavelength range.

As described above, the liquid crystal display device obtained offers a high light utilization efficiency and a high display quality.

Now, description will be given of a variation of the liquid crystal display device according to the third embodiment of the present invention.

Figure 23:
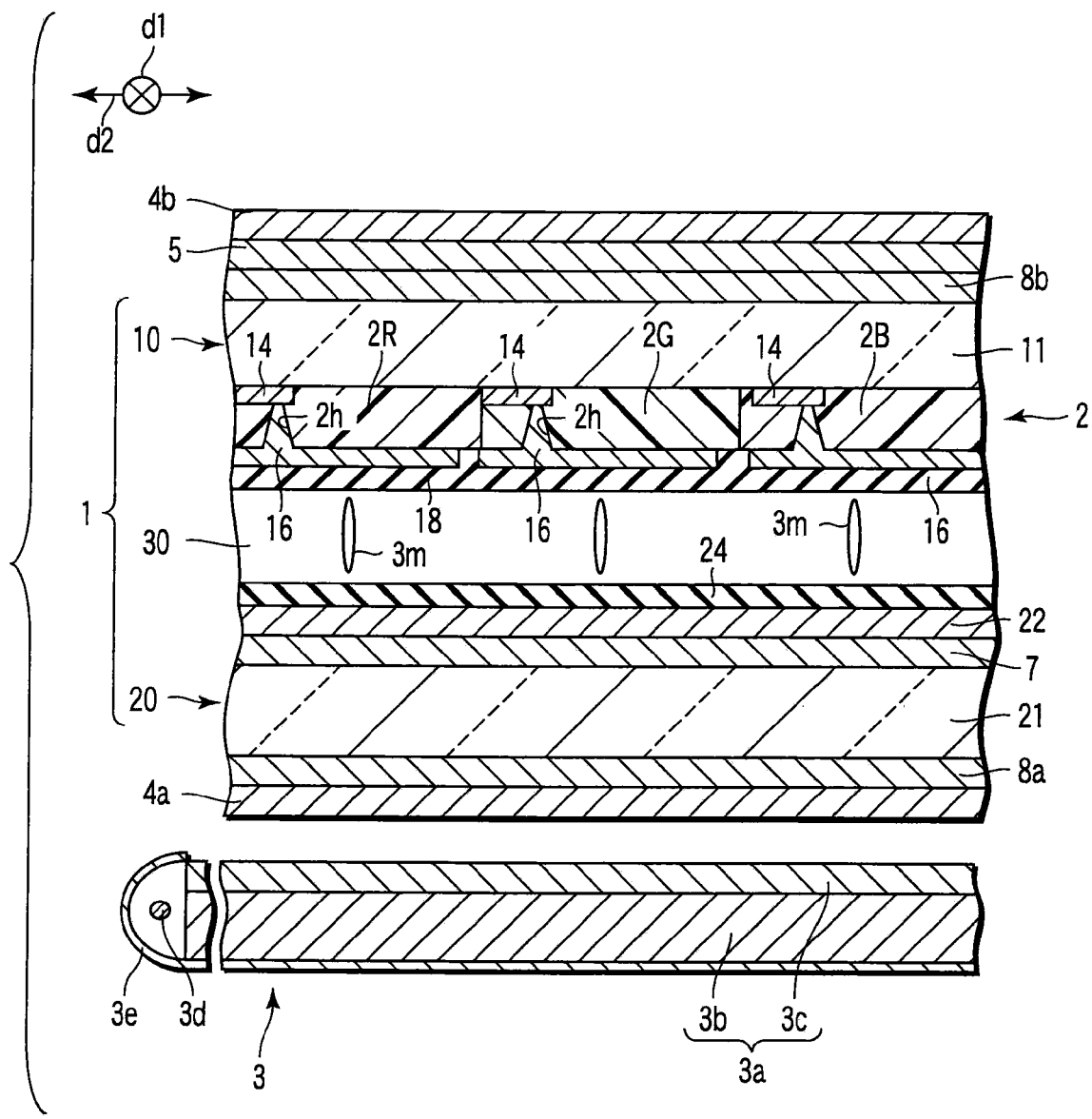
FIG. 23 is a sectional view showing a variation of the liquid crystal display device according to the third embodiment.

As shown in FIG. 23, in this variation, the color filter 2 is located on the glass substrate 11 of the array substrate 10. The polarizing reflection layer 7 is located on the glass substrate 21 of the opposite substrate 20. The opposite substrate 20 is positioned closer to the backlight unit 3 as a first substrate. The array substrate 10 is positioned closer to the display surface as a second substrate. The quarter wavelength plate 8a and the polarizing plate 4a are positioned on the outer surface side of the array substrate 10. The quarter wavelength plate 8b, the polarizing reflection layer 5, and the polarizing plate 4b are positioned closer to the outer surface side of the opposite substrate 20.

The remaining part of the configuration of the liquid crystal display device according to this variation is the same as that according to the third embodiment. The same components of the variation as those of the third embodiment are denoted by the same reference numerals and the detailed description of these components is omitted.

The liquid crystal display device provided by the above-described variation also offers a high light utilization efficiency and a high display quality, similarly to the liquid crystal display device according to the third embodiment.

The present invention is not limited to the as-described embodiments. In an implementation stage, the components of the embodiments can be varied without departing from the spirit of the present invention. Furthermore, various inventions can be formed by appropriately combining a plurality of the components disclosed in the above-described embodiments. For example, some of the components shown in the embodiments may be deleted. Moreover, components of different embodiments may be appropriately combined.

For example, if the liquid crystal display device is used only in an environment in which no external light enters the liquid crystal display device, then the polarizing plate 4b may be omitted from the device. This enables a reduction in required members and in manufacturing costs.

For the polarizing reflection layers, it is only necessary at least to provide the polarizing reflection layer 5 between the liquid crystal layer 30 and the polarizing plate 4b and to provide the polarizing reflection layers 6 and 7 as required. In this case, the polarizing reflection layer 6 may be provided between the polarizing plate 4a and the backlight unit 3. The polarizing reflection layer 7 may be provided between the polarizing plate 4a and the liquid crystal layer 30.

As shown in FIG. 24, if the polarizing reflection layers 5, 6, and 7 function as polarized light reflection layers that reflect linearly polarized light, each of the polarizing reflection layers 5, 6, and 7 may comprise a plurality of isotropic medium layers 40 made up of an isotropic medium and a plurality of anisotropic medium layers 50 having refractive index anisotropy, with the plurality of isotropic medium layers 40 and the plurality of anisotropic medium layers 50 stacked. In this case, the isotropic medium layers 40 and the anisotropic medium layers 50 are alternately stacked.

The anisotropic medium layers 50 have an ordinary light refractive index equal to the refractive index of the isotropic medium layers 40. The anisotropic medium layers 50 have parallel delay phase axes. Thus, linearly polarized light parallel to the delay phase axes is subjected to interfacial reflection in the respective layers. The linearly polarized light can thus be reflected in a desired manner. This reflectance of the linearly polarized light can be easily accomplished even during manufacture.

As shown in FIG. 25, if the polarizing reflection layers 5, 6, and 7 function as reflection layers that reflect circularly polarized light, each of the polarizing reflection layers 5, 6, and 7 may comprise a quarter wavelength plate 60 and a circularly polarized light reflection layer 70 which are stacked. It is also effective to combine the circularly polarized light reflection layer 70, which reflects circularly polarized light, and the quarter wavelength plate 60, which converts the circularly polarized light into linearly polarized light, to apply a technique similar to the above-described circularly polarized light reflection layer (the polarizing reflection layer 7 according to the third embodiment) to the liquid crystal display device.

In the embodiments, TFTs 14 are used as switching elements. However, effects similar to those described above can also be exerted by using thin film diodes (TFDs). Alternatively, effects similar to those described above can be exerted by using a simple matrix scheme based on multiplex driving. In the liquid crystal display panel 1, one of the array substrate 10 and the opposite substrate 20 has only to be located closer to the display surface.

What is claimed is:

1. A liquid crystal display device comprising:
    a liquid crystal display panel having a first substrate, a second substrate located opposite the first substrate with a gap between the first substrate and the second substrate, and a liquid crystal layer held between the first substrate and the second substrate;
    a first polarizing plate located opposite the liquid crystal layer;
    a first polarizing reflection layer positioned opposite the first polarizing plate across the liquid crystal layer and located opposite the liquid crystal layer to reflect linearly polarized light polarized in one direction parallel to a plane of the liquid crystal display panel;
    a second polarizing plate positioned opposite the liquid crystal layer across the first polarizing reflection layer and located opposite the first polarizing reflection layer, the second polarizing plate having an absorption axis parallel to a polarizing direction of the linearly polarized light reflected by the first polarizing reflection layer; and
    a second polarizing reflection layer positioned opposite the liquid crystal layer across the first polarizing plate and located opposite the first polarizing plate, the second polarizing reflection layer reflecting linearly polarized light parallel to a direction of an absorption axis of the first polarizing plate.

2. A liquid crystal display device comprising:
a liquid crystal display panel having a first substrate, a second substrate located opposite the first substrate with a gap between the first substrate and the second substrate, and a liquid crystal layer held between the first substrate and the second substrate;
a first polarizing plate located opposite the liquid crystal layer;
a first polarizing reflection layer positioned opposite the first polarizing plate across the liquid crystal layer and located opposite the liquid crystal layer to reflect linearly polarized light polarized in one direction parallel to a plane of the liquid crystal display panel;
a second polarizing plate positioned opposite the liquid crystal layer across the first polarizing reflection layer and located opposite the first polarizing reflection layer, the second polarizing plate having an absorption axis parallel to a polarizing direction of the linearly polarized light reflected by the first polarizing reflection layer; and
a second polarizing reflection layer located between the liquid crystal layer and the first polarizing plate and reflecting the linearly polarized light parallel to the direction of the transmission axis of the first polarizing plate.

3. A liquid crystal display device comprising:
a liquid crystal display panel having a first substrate, a second substrate located opposite the first substrate with a gap between the first substrate and the second substrate, and a liquid crystal layer held between the first substrate and the second substrate;
a first polarizing plate located opposite the liquid crystal layer;
a first polarizing reflection layer positioned opposite the first polarizing plate across the liquid crystal layer and located opposite the liquid crystal layer to reflect linearly polarized light polarized in one direction parallel to a plane of the liquid crystal display panel;
a second polarizing plate positioned opposite the liquid crystal layer across the first polarizing reflection layer and located opposite the first polarizing reflection layer, the second polarizing plate having an absorption axis parallel to a polarizing direction of the linearly polarized light reflected by the first polarizing reflection layer; and
a second polarizing reflection layer located between the liquid crystal layer and the first polarizing plate and reflecting the linearly polarized light parallel to the direction of the transmission axis of the first polarizing plate; and
a third polarizing reflection layer positioned opposite the liquid crystal layer across the first polarizing plate and located opposite the first polarizing plate, the third polarizing reflection layer reflecting linearly polarized light parallel to the direction of the absorption axis of the first polarizing plate.

4. The liquid crystal display device according to claim 2, wherein the second polarizing reflection layer has a reflectance of at least 10% and at most 90%.

5. The liquid crystal display device according to claim 1, wherein the second polarizing reflection layer comprises a plurality of isotropic medium layers comprising an isotropic medium and a plurality of anisotropic medium layers having refractive index anisotropy, the plurality of isotropic medium layers and the plurality of anisotropic medium layers being stacked.

6. The liquid crystal display device according to claim 3, wherein the third polarizing reflection layer comprises a plurality of isotropic medium layers comprising an isotropic medium and a plurality of anisotropic medium layers having refractive index anisotropy, the plurality of isotropic medium layers and the plurality of anisotropic medium layers being stacked.

7. The liquid crystal display device according to claim 1, wherein the second polarizing reflection layer comprises a quarter wavelength plate and a circularly polarized light reflection layer arranged opposite to the quarter wavelength plate.

8. The liquid crystal display device according to claim 3, wherein the third polarizing reflection layer comprises a quarter wavelength plate and a circularly polarized light reflection layer arranged opposite to the quarter wavelength plate.

9. A liquid crystal display device comprising:
a liquid crystal display panel having a first substrate, a second substrate located opposite the first substrate with a gap between the first substrate and the second substrate, and a liquid crystal layer held between the first substrate and the second substrate;
a first polarizing plate located opposite the liquid crystal layer;
a first polarizing reflection layer positioned opposite the first polarizing plate across the liquid crystal layer and located opposite the liquid crystal layer to reflect linearly polarized light polarized in one direction parallel to a plane of the liquid crystal display panel;
a second polarizing plate positioned opposite the liquid crystal layer across the first polarizing reflection layer and located opposite the first polarizing reflection layer, the second polarizing plate having an absorption axis parallel to a polarizing direction of the linearly polarized light reflected by the first polarizing reflection layer;
a first quarter wavelength plate located between the liquid crystal layer and the first polarizing plate;
a second quarter wavelength plate located between the liquid crystal layer and first the polarizing reflection layer; and
a second polarizing reflection layer located between the liquid crystal layer and the first quarter wavelength plate to reflect circularly polarized light passing through the first quarter wavelength plate and entering the second polarizing reflection layer so that a polarity of the reflected circularly polarized light remains unchanged.

10. The liquid crystal display device according to claim 9, wherein the second polarizing reflection layer has a reflectance of at least 10% and at most 90%.

11. The liquid crystal display device according to claim 9, wherein the second polarizing reflection layer is formed by polymerizing a cholesteric liquid crystal.

12. The liquid crystal display device according to claim 9, wherein the second polarizing reflection layer is formed by polymerizing a chiral liquid crystal.

13. The liquid crystal display device according to claim 9, wherein the first polarizing reflection layer and the second polarizing reflection layer each comprise a plurality of isotropic medium layers comprising an isotropic medium and a plurality of anisotropic medium layers having refractive index anisotropy, the plurality of isotropic medium layers and the plurality of anisotropic medium layers being stacked.

14. The liquid crystal display device according to claim 9, wherein the first polarizing reflection layer and the second polarizing reflection layer each comprise a quarter wavelength plate and a circularly polarized light reflection layer arranged opposite to the quarter wavelength plate.

15. The liquid crystal display device according to claim 9, wherein the liquid crystal layer is in one of two orientation conditions including a first condition in which a plurality of liquid crystal molecules are oriented in a normal direction of the plane or in a second condition in which the plurality of liquid crystal molecules are oriented in a plurality of directions inclined to the normal direction, depending on whether or not a voltage is applied between the first substrate and the second substrate.

16. A liquid crystal display device comprising:
- a liquid crystal display panel having a first substrate, a second substrate located opposite the first substrate with a gap between the first substrate and the second substrate, and a liquid crystal layer held between the first substrate and the second substrate;
- a first polarizing plate located opposite the liquid crystal layer;
- a first polarizing reflection layer positioned opposite the first polarizing plate across the liquid crystal layer and located opposite the liquid crystal layer to reflect linearly polarized light polarized in one direction parallel to a plane of the liquid crystal display panel;
- a first quarter wavelength plate located between the liquid crystal layer and the first polarizing plate;
- a second quarter wavelength plate located between the liquid crystal layer and the first polarizing reflection layer; and
- a second polarizing reflection layer located between the liquid crystal layer and the first quarter wavelength plate to reflect circularly polarized light passing through the first quarter wavelength plate and entering the second polarizing reflection layer so that a polarity of the reflected circularly polarized light remains unchanged.

* * * * *